United States Patent
Okada et al.

(10) Patent No.: US 6,736,604 B2
(45) Date of Patent: May 18, 2004

(54) CONTROL APPARATUS OF VARIABLE DISPLACEMENT PUMP FOR POWER STEERING APPARATUS

(75) Inventors: Kunio Okada, Saitama (JP); Yukihisa Kosugi, Saitama (JP); Minoru Masaki, Saitama (JP); Takashi Nakamura, Saitama (JP)

(73) Assignee: Unisia JKC Steering Systems Co., Ltd., Kanagawa (JP)

( * ) Notice: Subject to any disclaimer, the term of this patent is extended or adjusted under 35 U.S.C. 154(b) by 28 days.

(21) Appl. No.: 10/166,080

(22) Filed: Jun. 11, 2002

(65) Prior Publication Data

US 2002/0192081 A1 Dec. 19, 2002

(30) Foreign Application Priority Data

Jun. 18, 2001 (JP) ...................... P2001-183961

(51) Int. Cl.7 ................................ F04B 49/00
(52) U.S. Cl. .................. 417/213; 417/410.3; 417/210; 417/310; 417/220; 417/293
(58) Field of Search .............. 417/410.3, 210, 417/310, 220, 293, 213

(56) References Cited

U.S. PATENT DOCUMENTS

| | | | | |
|---|---|---|---|---|
| 4,496,288 A | * | 1/1985 | Nakamura et al. | 417/213 |
| 4,618,018 A | * | 10/1986 | Toshimitsu et al. | 180/422 |
| 5,290,155 A | * | 3/1994 | Snow et al. | 418/82 |
| 5,711,394 A | * | 1/1998 | Fujii et al. | 180/422 |
| 6,217,296 B1 | * | 4/2001 | Miyazawa et al. | 417/310 |
| 6,390,228 B2 | * | 5/2002 | Serizawa et al. | 180/403 |
| 6,468,044 B1 | * | 10/2002 | Bishop et al. | 417/220 |
| 6,524,076 B2 | * | 2/2003 | Konishi | 417/213 |
| 2002/0139605 A1 | * | 10/2002 | Modrzejewski et al. | 180/417 |
| 2003/0059312 A1 | * | 3/2003 | Konishi et al. | 417/213 |

FOREIGN PATENT DOCUMENTS

| | | |
|---|---|---|
| JP | 6-200883 | 7/1994 |
| JP | 7-243385 | 9/1995 |
| JP | 8-200239 | 8/1996 |

\* cited by examiner

*Primary Examiner*—Justine R. Yu
*Assistant Examiner*—Emmanuel Sayoc
(74) *Attorney, Agent, or Firm*—Sughrue Mion, PLLC

(57) ABSTRACT

First and second fluid pressure chambers are formed in both sides of a movement direction of a cam ring swingably placed within a pump body. A spool of a control valve is moved due to a pressure difference between the front and back of a metering orifice. Fluid pressures of the fluid pressure chambers are controlled. The cam ring is swung. Further, a solenoid for giving thrust in an axial direction thereof to the spool of the control valve and electronic control device for controlling driving of the solenoid are provided. The electronic control device has a steering sensor and determines a steering direction based on a signal from the steering sensor and also calculates a steering speed to the steering direction and controls a driving current of the solenoid in response to this steering speed and changes a discharge flow rate of a pump.

13 Claims, 15 Drawing Sheets

CONTROL APPARATUS OF VARIABLE DISPLACEMENT PUMP FOR POWER STEERING APPARATUS

The present disclosure relates to subject matter contained in Japanese Patent Application No. 2001-183961 filed Jun. 18, 2001, which is incorporated herein by reference in its entirety.

BACKGROUND OF THE INVENTION

1. Field of the Invention

The present invention relates to a variable displacement pump used as a fluid pressure source of a power steering apparatus for reducing handle operation force of an automobile, and particularly to a control apparatus of the variable displacement pump for power steering apparatus, the control apparatus for controlling a discharge flow rate of the variable displacement pump in response to a steering speed.

2. Description of the Related Art

A fluid pressure pump used in a power steering apparatus is required that a sufficient amount of pressure fluid can be fed to a power cylinder of the power steering apparatus in order to obtain steering auxiliary force corresponding to a steering state at the time of steering operation of a steering handle (so-called the time of steering). On the contrary, at the time of no steering such as the time of straight driving of a vehicle, it is practically unnecessary to feed the pressure fluid to the power steering apparatus. Also, this pump for the power steering apparatus is desired that driving stability at the time of straight driving at high speed can be ensured by decreasing the amount of feeding of the pressure fluid at the time of high speed driving to be less than the amount of feeding of the pressure fluid during a stop of the vehicle or at the time of low speed driving and providing stiffness to the steering handle at the time of high speed driving.

In general, a displacement pump according to the related art using an engine of a vehicle as a driving source was used as a pump for the power steering apparatus of this kind. The displacement pump has characteristics in which discharge flow rate increases with an increase in the number of revolutions of the engine. Therefore, a flow control valve for controlling the discharge flow rate from the pump at a constant amount or less irrespective of the number of revolutions becomes absolutely necessary to use the displacement pump as a pump for power steering apparatus. However, in the displacement pump having such a flow control valve, even when a part of pressure fluid is refluxed to a tank through the flow control valve, a load to the engine did not decrease and an energy-saving effect was not obtained since driving horsepower of the pump is the same.

In order to solve such a problem, variable displacement vane pumps capable of decreasing a discharge flow rate (cc/rev) per one revolution of the pump in proportion to an increase in the number of revolutions have been proposed by JP-A-Hei. 6-200883, JP-A-Hei. 7-243385 and JP-A-Hei. 8-200239. Since these variable displacement pumps are constructed so that a cam ring is moved in a direction in which a pump capacity of a pump chamber decreases in response to a size of a fluid pressure of the pump discharge side when the number of revolutions of an engine (the number of revolutions of the pump) increases, a flow rate of the pump discharge side can be decreased.

Since the variable displacement pumps as described above can relatively increase a flow rate of the pump discharge side when the number of revolutions of the engine is small even during a stop of a vehicle or at the time of low speed driving, in the case of steering during a stop of the vehicle or at the time of low speed driving, large steering auxiliary force can be obtained to perform light steering. Also, at the time of high speed driving of the vehicle, the number of revolutions of the engine becomes large and the flow rate of the pump discharge side relatively becomes small, so that steering in which moderate stiffness is provided to steering operation force at the time of high speed driving is enabled.

Also, in a displacement pump of this kind, it is desired that pressure fluid of a predetermined flow rate be fed to obtain predetermined steering auxiliary force at the time of steering (when steering is necessary) and also a feeding flow rate of the pressure fluid be set to substantially zero or the necessary minimum at the time of no steering (when steering is unnecessary) from the viewpoint of energy saving. For example, in the case of directly driving the variable displacement pump by the engine of the vehicle, at the time of no steering even when the number of revolutions of the engine is large, the amount of discharge from the pump is unnecessary and when the amount of pump discharge at this time is further decreased, driving horsepower of the pump can be suppressed and it is desired to consider such a point.

That is, in controlling the variable displacement pump of this kind, it is desired that it be determined whether a vehicle is stopping or driving at low speed, middle speed or high speed and whether or not steering is performed at the time of the driving and the optimum pump control be performed in response to a driving state of the vehicle. Therefore, it is necessary to take some measures plus an operating state of the pump or a driving state of the vehicle so that the driving state and steering state of such a vehicle are surely grasped and performance acting as a power steering apparatus is exercised by properly performing pump control and also driving control of the pump is performed in a required state and an energy-saving effect is obtained as the variable displacement pump.

An object of the present invention is to provide a variable displacement pump in which in addition to the configuration of the invention according to the application, it is constructed so that stable steering force in the vicinity of the center can be ensured by enabling detection of right and left steering directions and a more energy-saving effect can be achieved while improving steering performance.

In the case that operation of the electronic driving device is controlled in response to a steering speed without determining right and left steering directions of a steering handle as shown in the conventional configuration, when steering is performed right or left near to a neutral position of the steering handle, it is considered that steering has been performed continuously though the steering direction has changed right or left and a steering speed is calculated and the electronic driving device is driven and controlled in response to this steering speed, so that a problem that steering becomes light and stable steering force at the time of straight travel cannot be obtained arises.

On the other hand, the present invention is constructed so that it is not determined that steering has been performed in the case of right and left steering sandwiching a neutral position and only when steering with a predetermined angle or more in either right or left direction has been performed, this steering direction is determined and a steering speed in the steering direction is calculated and a discharge flow rate of a variable displacement pump is changed.

SUMMARY OF THE INVENTION

According to a first aspect of the invention, there is provided a control apparatus of a variable displacement pump for power steering apparatus, the variable displacement pump having a cam ring swingably supported within a pump body, a rotor rotatably placed within the cam ring, first and second fluid pressure chambers formed at both sides in a movement direction of the cam ring, a urging member for urging the cam ring in a direction in which a pump capacity of a pump chamber becomes maximum, a metering orifice provided at a midpoint of a discharge passage for pressure fluid delivered from the pump chambers, and a control valve including a spool acting in an axial direction-thereof due to fluid pressure difference between upper stream and down stream of the metering orifice, in which operation of the control valve controls the fluid pressure of at least one of the fluid pressure chambers to swing the cam ring, the control apparatus having an electronic driving device for giving thrust in the axial direction to the spool of the control valve and an electronic control device for controlling a driving current of the electronic driving device, in which the electronic control member comprises a steering sensor, the electronic control member determines a steering direction based on a signal from the steering sensor, the electronic control member calculates a steering speed in the steering direction, and the electronic control member controls the driving current of the electronic driving device in response to the steering speed.

According to the invention, since it is constructed so that the steering direction is determined by a pair of the steering sensors and the driving current to the electronic driving device is controlled in response to the steering speed to this determined steering direction, when right and left reciprocating steering is performed in the vicinity of a neutral position of a handle, it is not considered as steering of one direction and a discharge flow rate of the pump is not increased, so that stable steering force can be ensured and consumption energy of the pump can be reduced since there is no response to steering in the vicinity of the neutral position. Stable steering force can be ensured in response to the driving speed.

According to a second aspect of the invention, there is provided a control apparatus of a variable displacement pump for power steering apparatus, the variable displacement pump having a cam ring swingably supported within a pump body, a rotor rotatably placed within the cam ring, first and second fluid pressure chambers formed at both sides in a movement direction of the cam ring, a urging member for urging the cam ring in a direction in which a pump capacity of a pump chamber becomes maximum, a metering orifice provided at a midpoint of a discharge passage for pressure fluid delivered from the pump chambers, and a control valve including a spool acting in an axial direction thereof due to fluid pressure difference between upper stream and down stream of the metering orifice, in which operation of the control valve controls the fluid pressure of at least one of the fluid pressure chambers to swing the cam ring, the control apparatus having an electronic driving device for giving thrust in the axial direction to the spool of the control valve, and an electronic control device for controlling a driving current of the electronic driving device, in which the electronic control member comprises a steering sensor and a vehicle speed sensor, the electronic control member determines a steering direction based on a signal from the steering sensor, the electronic control member calculates a steering speed in the steering direction, and the electronic control member controls the driving current of the electronic driving device so that a rising point of discharge flow rate changes in response to the steering speed and a vehicle speed from the vehicle speed sensor.

According to a third aspect of the invention, there is provided a control apparatus of a variable displacement pump for power steering apparatus, the variable displacement pump having a cam ring swingably supported within a pump body, a rotor rotatably placed within the cam ring, first and second fluid pressure chambers formed at both sides in a movement direction of the cam ring, a urging member for urging the cam ring in a direction in which a pump capacity of a pump chamber becomes maximum, a metering orifice provided at a midpoint of a discharge passage for pressure fluid delivered from the pump chambers, and a control valve including a spool acting in an axial direction thereof due to fluid pressure difference between upper stream and down stream of the metering orifice, in which operation of the control valve controls the fluid pressure of at least one of the fluid pressure chambers to swing the cam ring, the control apparatus having an electronic driving device for giving thrust in the axial direction to the spool of the control valve, and an electronic control device for controlling a driving current of the electronic driving device, the electronic control member comprises a steering sensor and a vehicle speed sensor, the electronic control member determines a steering direction based on a signal from the steering sensor, the electronic control member calculates a steering speed in the steering direction, the electronic control member controls the driving current of the electronic driving device in response to the steering speed and a vehicle speed from the vehicle speed sensor, and the driving current of the electronic driving device is controlled so that discharge flow rate at a time of straight travel during high speed driving is lower than that at a time middle speed driving.

According to a fourth aspect of the invention, there is provided a control apparatus of a variable displacement pump for power steering apparatus, the variable displacement pump having a cam ring swingably supported within a pump body, a rotor rotatably placed within the cam ring, first and second fluid pressure chambers formed at both sides in a movement direction of the cam ring, a urging member for urging the cam ring in a direction in which a pump capacity of a pump chamber becomes maximum, a metering orifice provided at a midpoint of a discharge passage for pressure fluid delivered from the pump chambers, and a control valve including a spool acting in an axial direction thereof due to fluid pressure difference between upper stream and down stream of the metering orifice, in which operation of the control valve controls the fluid pressure of at least one of the fluid pressure chambers to swing the cam ring, the control apparatus having an electronic driving device for giving thrust in the axial direction to the spool of the control valve, and an electronic control device for controlling a driving current of the electronic driving device, in which the electronic control member comprises a steering sensor and a vehicle speed sensor, the electronic control member determines a steering direction based on a signal from the steering sensor, the electronic control member calculates a steering speed in the steering direction, the electronic control member controls the driving current of the electronic driving device in response to the steering speed and a vehicle speed from the vehicle speed sensor, and the driving current of the electronic driving device is controlled so that maximum discharge flow rate at a time of steering during a vehicle stop or low speed driving is lower than that at a time of middle speed driving.

According to a fifth aspect of the invention, there is provided the control apparatus according to one of the first to fourth aspects, in which the electronic control device calculates a steering angle from the neutral position and the electronic control device controls the driving current of the electronic driving device in response to the steering angle.

According to the fifth aspect of the invention, a neutral position of a handle is detected and the steering angle from the neutral position is calculated and, driving of the electronic driving device is controlled, so that steering force does not reduce at the time of holding steering.

According to a sixth aspect of the invention, there is provided the control apparatus according to the first to fourth aspect of the invention, in which wherein a pressure sensor for detecting a fluid pressure in the discharge passage is provided and a discharge flow rate is controlled based on maximum steering speed within a period during which a detection pressure of the pressure sensor is not less than a predetermined.

According to the sixth aspect of the invention, the presence or absence of steering is determined by on-off of a pressure switch to detect that there is in holding steering and the electronic driving device is controlled, so that a reduction in steering force at the time of holding steering can be prevented.

According to a seventh aspect of the invention, there is provided the control apparatus according to one of the first to fourth aspects, in which the electronic control device comprises a G sensor, and a discharge flow rate is controlled based on maximum steering speed within a period during which lateral G detected by the G sensor is not more than a predetermined value.

According to the seventh aspect of the invention, the lateral G is detected by the G sensor to determine whether or not there is in cornering, so that steering force at the time of holding steering does not reduce.

According to an eighth aspect of the invention, there is provided the control apparatus according to the first aspect, in which the electronic control member controls the driving current of the electronic driving device so that discharge flow rate decreases as vehicle speed increases.

BRIEF DESCRIPTION OF THE DRAWINGS

Exemplary embodiments are described below with reference to the drawings, in which like reference numerals represent like parts, and wherein.

DETAILED DESCRIPTION OF PREFERRED EMBODIMENTS

Figure 1:
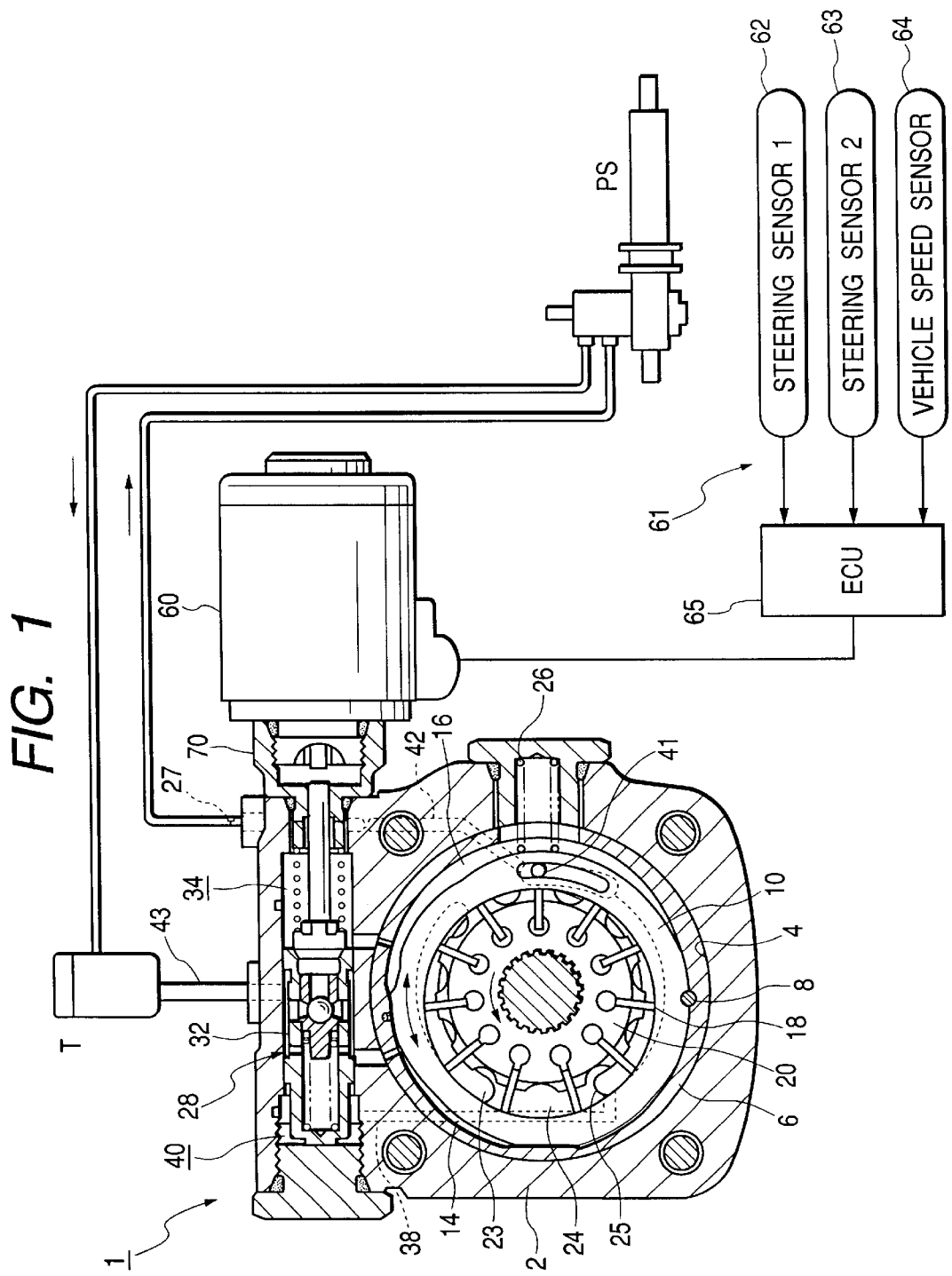
FIG. 1 is a diagram showing the whole configuration of a control apparatus of a variable displacement pump for power steering apparatus according to one embodiment of the invention.
Figure 2:
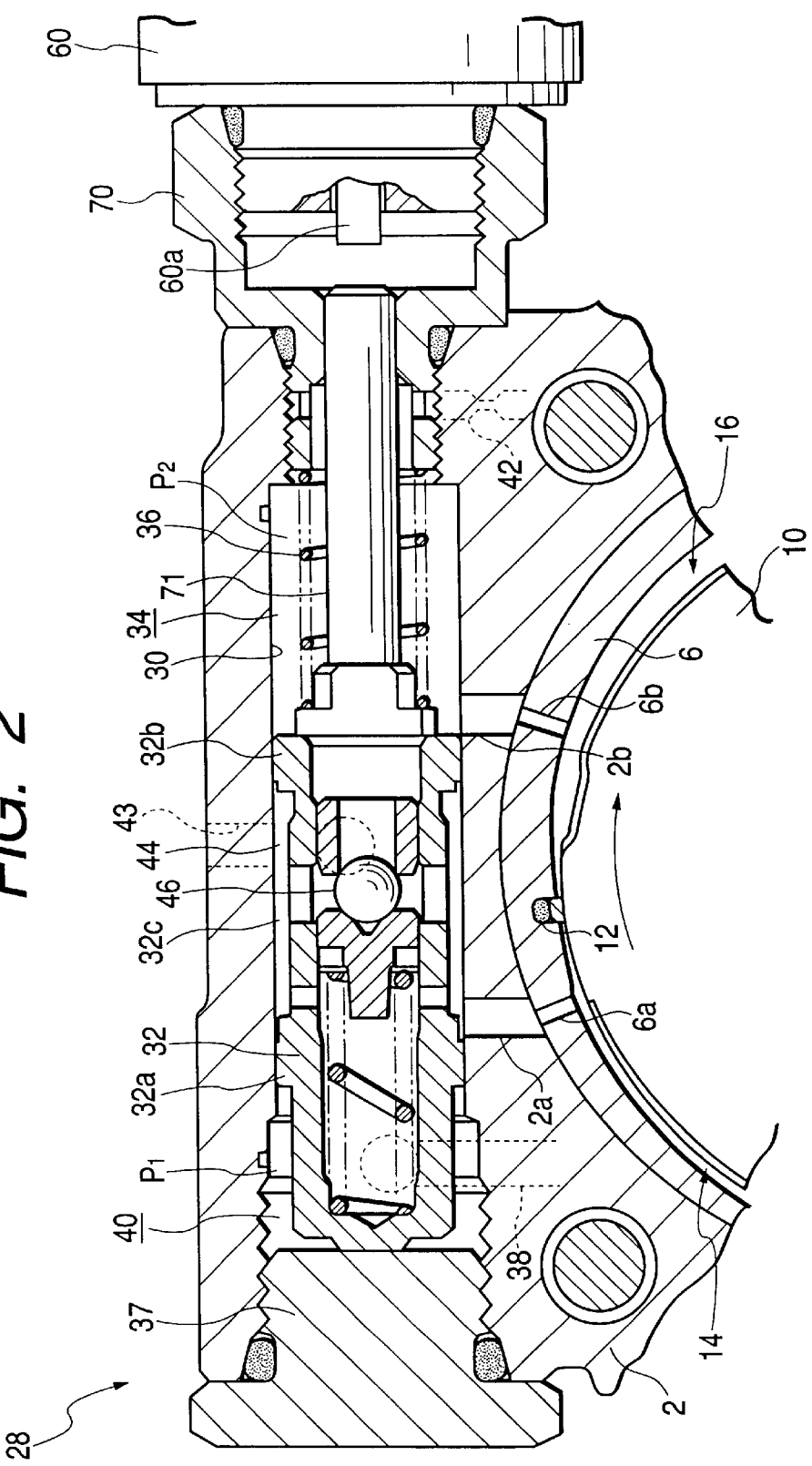
FIG. 2 is a diagram enlarging and showing a main portion (control valve) of the control apparatus of the variable displacement pump for power steering apparatus.

The invention will be described below in accordance with embodiments shown in the drawings. FIG. 1 is a sectional view showing the whole configuration of a control apparatus of a variable displacement pump for power steering apparatus according to one embodiment of the invention. FIG. 2 is a sectional view showing a structure of a control valve provided in the variable displacement pump. This variable displacement pump (the whole thereof is represented by reference numeral 1) shows a case that the invention is applied to an oil pump of vane type acting as an oil pressure generation source of a power steering apparatus PS.

Holding space 4 for holding and placing a pump component acting as a pump cartridge described later is defined within a pump body 2 made by abutting a front body with a rear body, and an adapter ring 6 is fitted in the inside of this holding space 4. A cam ring 10 is swingably placed within substantially elliptic space of this adapter ring 6 through a swing fulcrum pin 8. A seal member 12 is provided in a position substantially axially symmetrical to the swing fulcrum pin 8 of this cam ring 10 and by these swing fulcrum pin 8 and seal member 12, a first fluid pressure chamber 14 and a second fluid pressure chamber 16 are partitioned and formed in both sides of the cam ring 10.

Further, a rotor 20 for swingably holding plural vanes 18 in a radial direction is placed in the inner circumferential side of the cam ring 10. This rotor 20 is coupled to a drive shaft 22 which passes through the pump body 2 and is rotatably supported, and rotates by the drive shaft 22 rotated and driven by an engine (not shown) in a direction of an arrow shown in FIG. 1. The cam ring 10 is placed in an eccentric state with respect to the rotor 20 coupled to the drive shaft 22, and a pump chamber 24 is formed by the adjacent two vanes 18 within space formed between these cam ring 10 and rotor 20. This cam ring 10 swings using the swing fulcrum pin 8 as a fulcrum and thereby, volume of the pump chamber 24 increases or decreases.

A compression coil spring 26 is placed in the side of the second fluid pressure chamber 16 of the pump body 2, and always urges the cam ring 10 in a direction in which volume of the side of the first fluid pressure chamber 14, namely the pump chamber 24 becomes maximum.

In the holding space 4 of the inside of the pump body 2, the adapter ring 6, the cam ring 10 and the rotor 20 are pinched and held from both sides by a pressure plate (not shown) and a side plate (or a rear body serving as a side plate).

A suction side opening 23 is formed in the side of the side plate of a region (upper portion of FIG. 1) in which volume of the pump chamber 24 formed between the adjacent two vanes 18 gradually increases with rotation of the rotor 20, and operating fluid sucked from a tank through a suction port (not shown) is supplied to the pump chamber 24. Also, a discharge side opening 25 is formed in the side of the pressure plate of a region (lower portion of FIG. 1) in which the volume of the pump chamber 24 gradually decreases with rotation of the rotor 20. Pressure fluid discharged from the pump chamber 24 is introduced to a discharge side pressure chamber formed in the bottom of the pump body 2. This discharge side pressure chamber is connected to a discharge port 27 through a pump discharge side passage formed in the pump body 2, and the pressure fluid introduced to the discharge side pressure chamber is sent from the discharge port 27 to a power cylinder of a power steering apparatus PS.

A control valve 28 is provided within the pump body 2 toward a direction perpendicular to the drive shaft 22. This control valve 28 has a spool 32 slidably fitted into a valve hole 30 formed in the pump body 2. This spool 32 is always urged toward the left (direction of the first fluid pressure chamber 14) of FIG. 1 by a spring 36 placed within a chamber 34 (hereinafter called a spring chamber) of the side of one end (the side end of the second fluid pressure chamber 16 of the right of FIG. 1) of its spool 32. In the case of no operation, the spool 32 abuts on a front of a plug 37 screwed in an opening of the valve hole 30 to block the opening at the time of no operation and the spool 32 stops.

A metering orifice 41 is provided at some midpoint of a discharge side passage from the pump chamber 24 to the power steering apparatus PS. Fluid pressure in an upstream side of this metering orifice 41 is introduced into a chamber 40 (hereinafter called a high pressure chamber) at the left of FIG. 1 through a pilot pressure passage 38. On the other hand, a fluid pressure in a downstream side of the metering orifice 41 is introduced into the spring chamber 34 through a pilot passage 42. When a pressure difference between both of these chambers 34 and 40 becomes a predetermined value or more, the spool 32 moves against the spring 36 in the right direction of the drawing.

The first fluid pressure chamber 14 formed in the left of the cam ring 10 communicates to the side of the high pressure chamber 40 of the valve hole 30 through connection passages 2a, 6a formed in the pump body 2 and the adapter ring 6. The second fluid pressure chamber 16 formed in the right of the cam ring 10 communicates to the side of the spring chamber 34 of the valve hole 30 through connection passages 2b, 6b formed in the pump body 2 and the adapter ring 6.

A first land part 32a for partitioning the high pressure chamber 40 and a second land part 32b for partitioning the spring chamber 34 are formed in an outer circumferential surface of the spool 32, and an annular groove part 32c is provided in the middle of both of these land parts 32a and 32b. This middle annular groove part 32c is connected to a tank T through a pump suction side passage 43, and space between this annular groove part 32c and an inner circumferential surface of the valve hole 30 constructs a pump suction side chamber 44.

It is constructed so that when the spool 32 is in a no operation position shown in FIG. 1, the first fluid pressure chamber 14 provided in the left of the cam ring 10 is connected to the pump suction side chamber 44 through the connection passages 2a, 6a and when the spool 32 operates by a pressure difference between the front and the back of the metering orifice 41, the first fluid pressure chamber 14 is gradually disconnected from the pump suction side chamber 44 and is communicated to the high pressure chamber 40. Therefore, a pressure $P_0$ of the pump suction side and a pressure $P_1$ of the upstream side of the metering orifice 41 provided within the pump discharge side passage are selectively supplied to the first fluid pressure chamber 14.

Also, at the time of no operation of the spool 32, the second fluid pressure chamber 16 provided in the right of the cam ring 10 is connected to the spring chamber 34 through the connection passages 2b, 6b and when the spool 32 operates, the second fluid pressure chamber 16 is gradually disconnected from the spring chamber 34 and also is gradually connected to the pump suction side chamber 44. Therefore, a pressure $P_2$ of the downstream side of the metering orifice 41 and the pressure $P_0$ of the pump suction side are selectively supplied to the second fluid pressure chamber 16.

It is constructed so that a relief valve 46 is provided in the inside of the spool 32 and is opened when a pressure (the pressure $P_2$ of the downstream side of the metering orifice 41, in other words, operating pressure of the power steering apparatus PS) within the spring chamber 34 rises to a predetermined value or more and this fluid pressure is relieved to the side of the tank T.

Further, the variable displacement pump 1 according to the embodiment has a solenoid 60 acting as an electronic driving device for applying axial thrust to the spool 32 of the control valve 28 from the side of the spring chamber 34 toward the side of the high pressure chamber 40. Also, an electronic control device 61 for controlling a driving current of this solenoid 60 is provided. In this embodiment, the electronic control device 61 has two steering sensors (a first steering sensor 62 and a second steering sensor 63), a vehicle speed sensor 64 and a control unit 65. Each of two steering sensors includes a detecting section such as photo photo-interrupter, MR element, and hall element. Incidentally, in this embodiment, the electronic control device 61 has two steering sensors 62, 63. These steering sensors 62, 63 have the detecting sections such as photo photo-interrupter, MR element, and hall element, respectively. Steering direction is determined by a pair of detecting sections provided in the two steering sensors 62, 63. However, it is not necessary to provide two steering sensors. One steering sensor may have two detecting sections so that the pair of detecting sections may determined the steering direction.

A structure for applying thrust to the control valve 28 by the solenoid 60 will be described briefly. A screw hole is formed in the side of the spring chamber 34 of the control valve 28 and a plug member 70 is screwed and fixed into this screw hole. The solenoid 60 is mounted in the outward end of this plug member 70 with the top of a solenoid rod 60a directed to the inside of the valve hole 30. On the other hand, a rod member 71 is attached to the end portion of the spool 32 at the side of the spring chamber 34, and the solenoid rod 60a is opposed to the top of this rod member 71. These solenoid rod 60a and rod member 71 are opposed at a predetermined spacing as shown in FIG. 2 when the pump 1 is in no operation state. Then, when the pump 1 operates and the control valve 28 becomes an equilibrium state, namely a state in which both of the first and second fluid pressure chambers 14, 16 of both sides of the cam ring 10 are stable in a connection or connectable position to the pump suction side chamber 44, both of these rods 60a, 71 are opposed while the tops abut substantially.

The two steering sensors 62, 63 provided in the electronic control device 61 are sensors which are mounted in a steering column (not shown) and detect rotation of a steering handle. Generally, the two steering sensors 62, 63 are sensors with a structure for performing detection by combination of a slit and a photo-interrupter. The electronic control device 61 determines right or left steering based on outputs of the two steering sensors 62, 63, calculates steering speed in the determined direction, and control the discharge flow rate of the variable displacement pump 1 is controlled.

For example, in the case of controlling the variable displacement pump using one steering sensor, there was a problem that stable steering force cannot be obtained at the time of straight travel. Because control is performed in response to the steering speed even when steering is performed in a right or left direction in the vicinity of the center of a steering handle. However, in this embodiment, the two steering sensors 62, 63 are provided in the steering column, the steering of a right or left direction is determined based on the outputs of both of the steering sensors 62, 63, the steering speed in the determined direction is calculated, and a supply current to the solenoid 60 is controlled in response to the steering speed to change the discharge flow rate of the variable displacement pump.

In the configuration described above, in no steering state, the equilibrium state is maintained and the discharge flow rate from the pump 1 becomes the minimum flow rate defined by the metering orifice 41. In this case, the solenoid 60 is maintained in no current-carrying state. Then, when steering is requested in the equilibrium state, a vehicle speed and a pump discharge flow rate in response to a steering speed to one direction are obtained. That is, in accordance with signals from the steering sensors 62, 63 and the vehicle speed sensor 64, a predetermined current-carrying current is supplied to the solenoid 60 through the control unit 65.

When the predetermined current is supplied to the solenoid 60, the solenoid rod 60a applies thrust in a left direction of the drawing to the spool 32 through the rod member 71. Then, the spool 32 moves in the left direction of the drawing in response to the thrust depending on magnitude of the current-carrying current. The first fluid pressure chamber 14 is connected to the pump suction side chamber 44. Also, the second fluid pressure chamber 16 is connected to the spring chamber 34 of the fluid pressure P$_2$ in the downstream side of the metering orifice 41. Whereby, the cam ring 10 moves to the left of the drawing to increase volume of the pump chamber 24. Therefore, the amount of discharge from the pump 1 increases in accordance with a value controlled by the electronic control device 61 described above.

Figure 3:
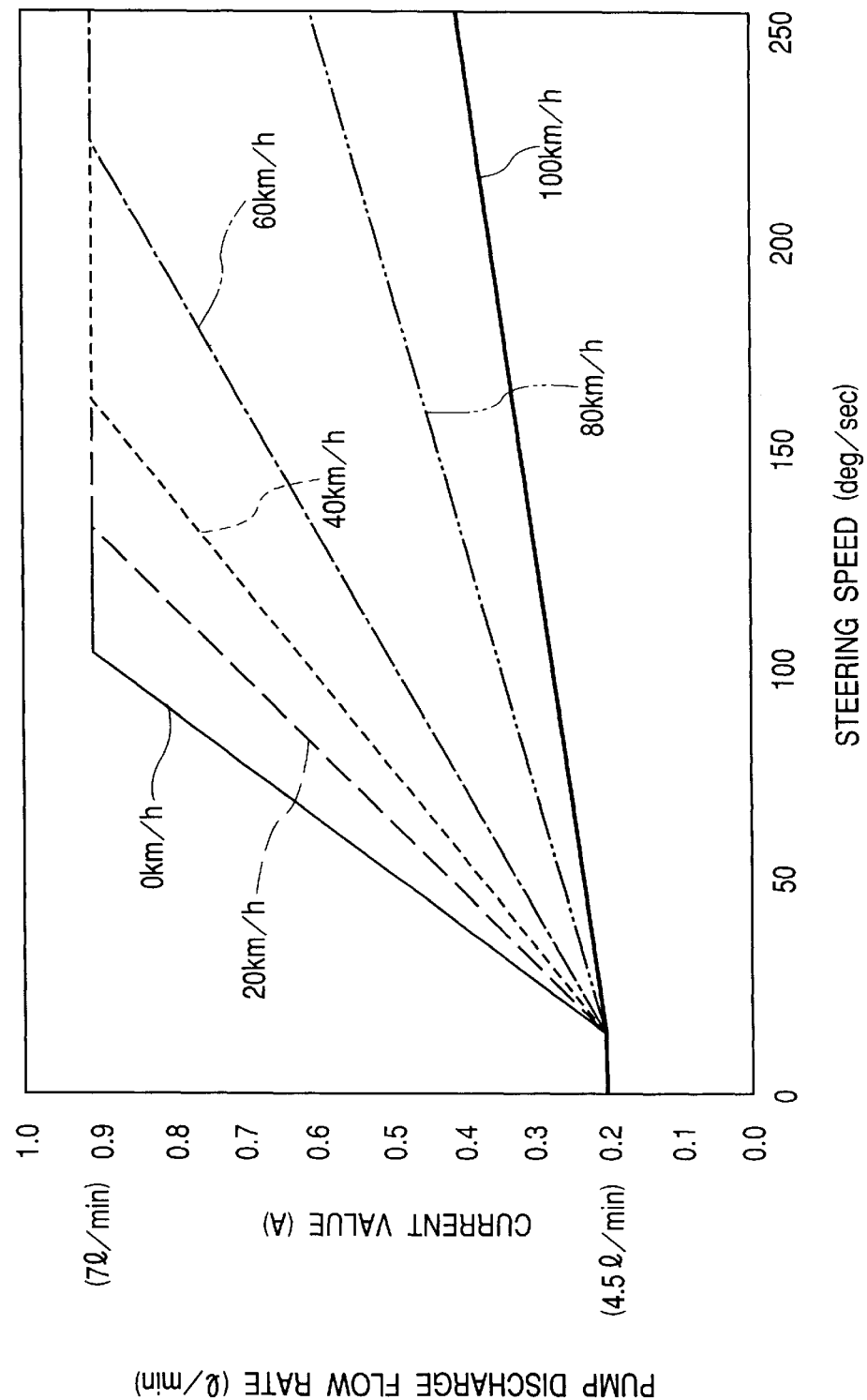
FIG. 3 is a graph showing one example of a steering speed-current characteristic by the control apparatus according to the invention.

FIG. 3 is a graph showing one example of "steering speed-current characteristic table" for determining a solenoid driving current in response to the steering speed. The current value in response to the steering speed is retrieved based on vehicle speed detected by the vehicle speed sensor 64 (in this graph, vehicle speed of 0 km/h, 20 km/h, 40 km/h, 60 km/h, 80 km/h, 100 km/h). This embodiment is set so that a discharge flow rate from the pump is a minimum (4.5 l/min) for a current value of 0.2 A and the discharge flow rate is a maximum (7 l/min) for a current value of 0.9 A. In this characteristic, when a steering speed is less than 15 deg/sec, 0.2 A, which makes the discharge flow rate to be the minimum, is outputted to the solenoid in the case of any driving speed. In this characteristic, when the steering speed is not less than 15 deg/sec, the driving speed is the lower, the larger current is outputted to the solenoid to increase the discharge flow rate.

Figure 4:
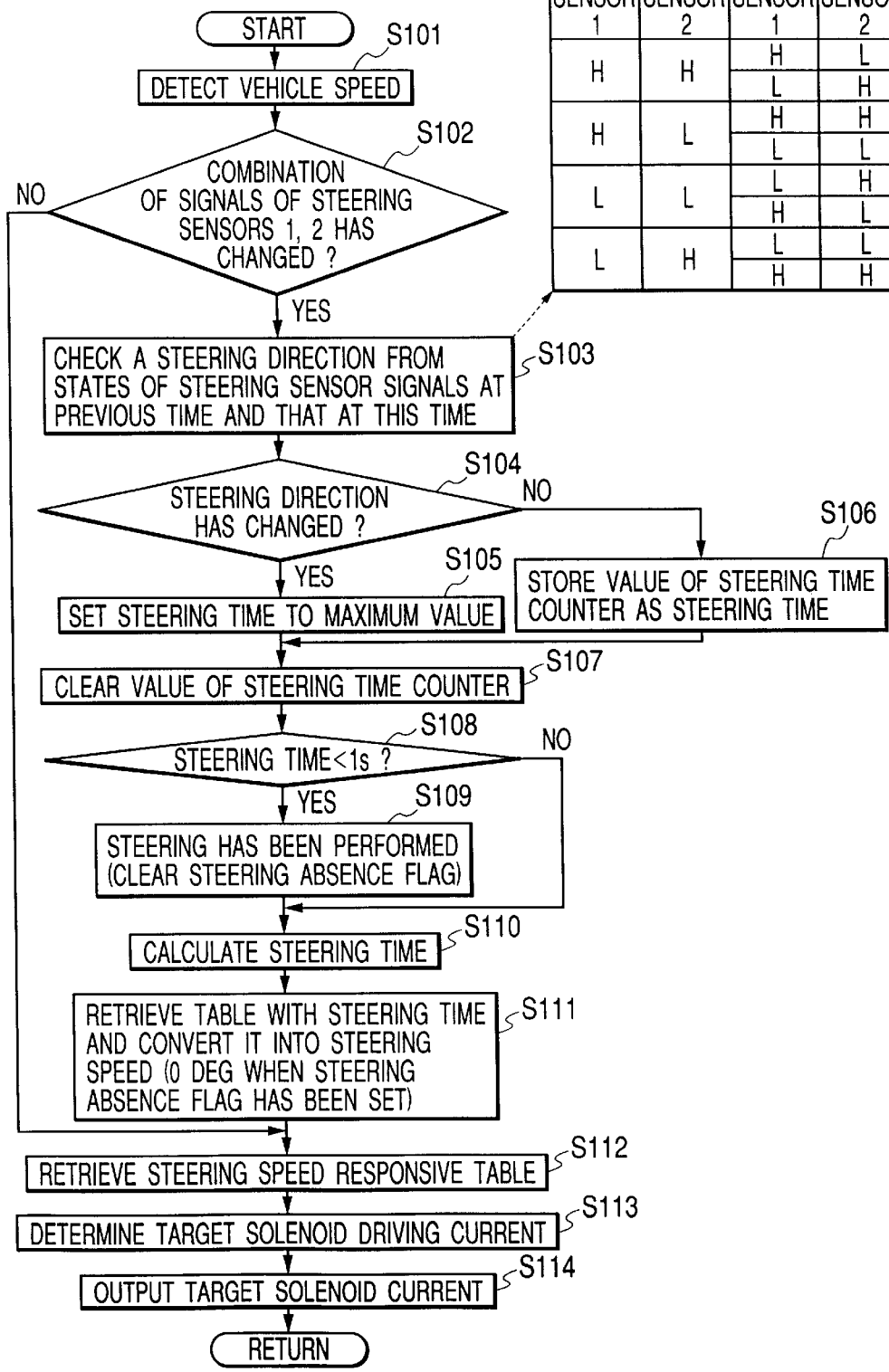
FIG. 4 is a flowchart showing one example of control of electronic driving device according to a first embodiment.
Figure 5:
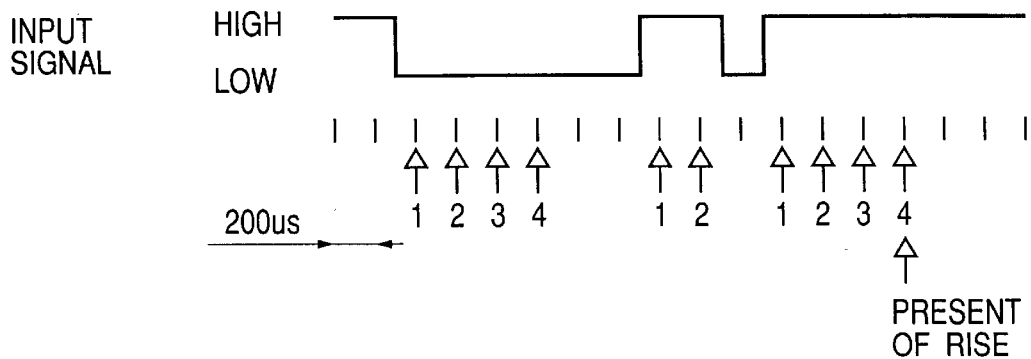
FIG. 5 is an explanatory diagram showing one example of the case of performing detection of a vehicle speed signal.

A procedure for controlling a driving current of the electronic driving device (solenoid) 60 by the electronic control device 61 will be described according to a flowchart of FIG. 4. First, in step 101 (S101), the vehicle speed sensor 64 detects a speed of a vehicle. In detection of the vehicle speed signal, a state of a port is checked every 200 μs and it is decided that the vehicle speed has increased when a High level continues four times after a Low level continues four times (see FIG. 5).

Next, by processing or decision subsequent to step 102 (S102), a steering direction and a steering speed are detected from detection signals of the two steering sensors 62, 63. In this embodiment, a configuration of the two steering sensors 62, 63 is not shown in the drawing. A rotary plate in which 60 slits are formed is mounted in the steering column and two photo-interrupters are set by a phase difference of 90° with respect to this rotary plate and a steering direction is detected by combination of steering signals from these steering sensors 62, 63 and a steering speed of this steering direction is calculated.

Figure 6:
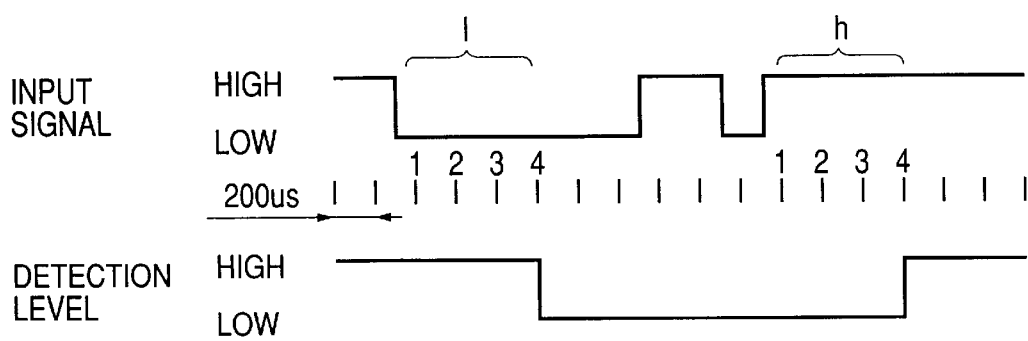
FIG. 6 is an explanatory diagram showing one example of the case of performing detection of a steering signal.

In detection of a steering signal, for example, checks are made every 200 μs. When the same level continues four times the detection is determined to be effective and a detection level is determined as HIGH or LOW. As shown in FIG. 6, when the input signals are Low levels continuously four times, the detection is determined to be effective (see a range l in FIG. 6) and a detection level is determined as LOW. Also, when input signals are HIGH levels continuously four times, the detection is determined to be effective (see a range h in FIG. 6) and a detection level is determined as HIGH. Incidentally, checks of the vehicle speed sensor 64 and the steering sensors 62, 63 are not limited to checks made every 200 μs and, for example, may be every 400 μs.

Figure 7:
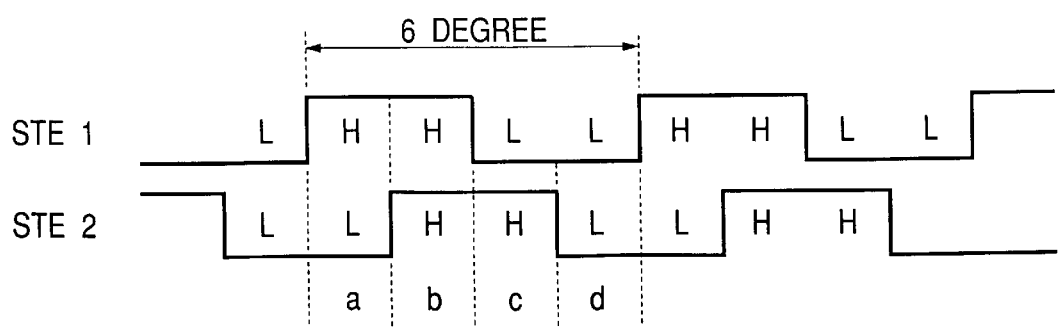
FIG. 7 is an explanatory diagram showing one example of the case of performing processing of the steering signal.

FIG. 7 is a diagram showing one example of processing of steering sensor signals outputted from the first and second steering sensors 62, 63. Let a combination in which a steering signal (STE1) from the first steering sensor 62 is H and a steering signal (STE2) from the second steering sensor 63 is L be a. Let a combination in which the steering signal from the first steering sensor 62 is H and the steering signal from the second steering sensor 63 is H be b. Let a combination in which the steering signal from the first steering sensor 62 is L and the steering signal from the second steering sensor 63 is H be c. Let a combination in which the steering signal from the first steering sensor 62 is L and the steering signal from the second steering sensor 63 is L be d. A steering direction is detected based on a change in the combinations of the steering signals. Also, states of the first and second steering sensors 62, 63 are checked and each time at which the combinations of a, b, c, d of FIG. 7 have occurred is measured.

In step 102 (S102), it is decided whether or not the combination of a first steering sensor signal (STE1) and a second steering sensor signal (STE2) at this time have changed from that at previous time. When the combinations have changed, the flowchart proceeds to step 103 (S103) and a steering direction is checked from states of the steering sensor signals at the previous time and that at this time. For example, as shown in a table of the upper right of FIG. 4, it is assumed that, at the previous time, the first steering sensor signal is H and the second steering sensor signal is H (the combination b). When the combination is changed to the combination in which the first steering sensor signal of this time is H and the second steering sensor signal is L (combination a), it is checked that the steering direction is the left. When the combination is changed to the combination in which the first steering sensor signal is L and the second steering sensor signal is H (combination c), it is checked that the steering direction is the right.

After checking the steering direction in step 103 (S103), the flowchart proceeds to step 104 (S104) and it is decided whether or not the steering direction has changed. In this step, it is decided that steering has been performed in a right direction when the combinations of the steering signal from the first steering sensor 62 and the steering signal from the second steering sensor 63 have changed by 6° (one pulse of the case of a steering sensor with 60 pulses per one revolution according to the configuration) in the same direction (steering direction does not change) in order of a→b→c→d→a, for example, when the combinations have changed in order of d→a→b→c. Also, in reverse, it is decided that steering has been performed in a left direction when the combinations have changed by 6° in order of a→d→c→b→a, for example, c→b→a→d.

When it is decided that the steering direction has changed in step 104 (S104), the flowchart proceeds to step 105 (S105) and steering time is set to the maximum value. The maximum value described herein means the MAX value of a hexadecimal counter, which is a value incapable of counting further. That is, the steering time of the maximum value means that steering is not performed.

Also, when it is decided that the steering direction has not changed in step 104 (S104), the steering direction is determined here and the flowchart proceeds to step 106 (S106). In step 106 (S106), a value of the steering time counter is stored as the steering time. Thereafter, in step 107 (S107), the value of the steering time counter counted every 200 μs is cleared.

Next, in step 108 (S108), it is decided whether or not the steering time is shorter than 1 second. When the steering time is shorter than 1 second, steering is performed and the flowchart proceeds to steering time calculation of step 110 (S110) In this case, when a steering absence flag has been set, the flag is cleared. Incidentally, a steering signal absence flag is set when a value of the steering time counter becomes 1 second or longer. Also, when the steering time is 1 second or longer, the flowchart proceeds to step 110 (S110).

In step 110 (S110), each time of the combinations of the first steering sensor signal and the second steering sensor signal by which the steering direction is determined, for example, each time of a→b→c→d is summed to obtain the steering time. Subsequently, in step 111 (S111), a steering time to steering speed conversion table is retrieved with the steering time obtained in step 110 (S110) and a conversion is made into a steering speed. The steering speed obtained from this conversion table is set to a capture value. Incidentally, when the steering signal absence flag is set (the first and second steering signals do not change for 1 second or longer as described above), the capture value is set to 0 deg/sec.

The capture value is compared with a control value (initial value 0 deg/sec) and the following control is performed at the time of updating the control value. That is, in the case of the capture value≧the control value, the capture value is set to the control value. Also, in the case of the capture value<the control value, the control value is approximated to the capture value slowly (for example, to 20 ms at a ratio of 1 deg/sec).

Next, in step 112 (S112), a steering speed responsive table (steering speed-current characteristic table) is retrieved and a target solenoid driving current is determined (S113) and a target solenoid current is outputted (S114). FIG. 3 is a graph showing one example of the steering speed-current characteristic table.

Since it is thus constructed so that the two steering sensors 62, 63 are provided in the steering column and a right or left steering direction is determined by output of these steering sensors 62, 63 and a steering speed to its steering direction is calculated and a discharge flow rate of the variable displacement pump 1 is changed, stable steering force in the vicinity of the center of a handle can be ensured. Also, since there is no response to right and left steering in the vicinity of the center, energy consumption of the pump can be reduced. Further, by performing variable control by a vehicle speed, stable steering force can be ensured in response to a driving speed.

Incidentally, a characteristic of the steering speed responsive table shown in FIG. 3 is one example and a different characteristic can be set in order to obtain the optimum steering performance. For example, when a vehicle speed responsive feeling is small since a flow rate of swerve starting of a handle is always small, as shown in a range A of FIG. 8, this problem can be solved by shifting a rise point of a steering speed-current characteristic in response to a vehicle speed. In an example of FIG. 8, it is constructed so that in the case of stopping (for example, a vehicle speed of 0 km/h), the current value is raised at a steering speed of 10 deg/sec from the minimum current value of 0.2 A and in the case of low speed driving (for example, a vehicle speed of 20 km/h), the current value is raised at a steering speed of 20 deg/sec and also in the case of high speed driving (for example, vehicle speeds in a range of from 80 km/h to 100 km/h), the current value is raised at a steering speed of 30 deg/sec. Further, it is constructed so that in the case of middle speed driving (for example, vehicle speeds in a range of from 40 km/h to 60 km/h), the current value is raised at a steering speed of 30 deg/sec from a current value of 0.3 A. Incidentally, ranges of the low speed driving, middle speed driving, and high speed driving can changed desirably.

Figure 8:
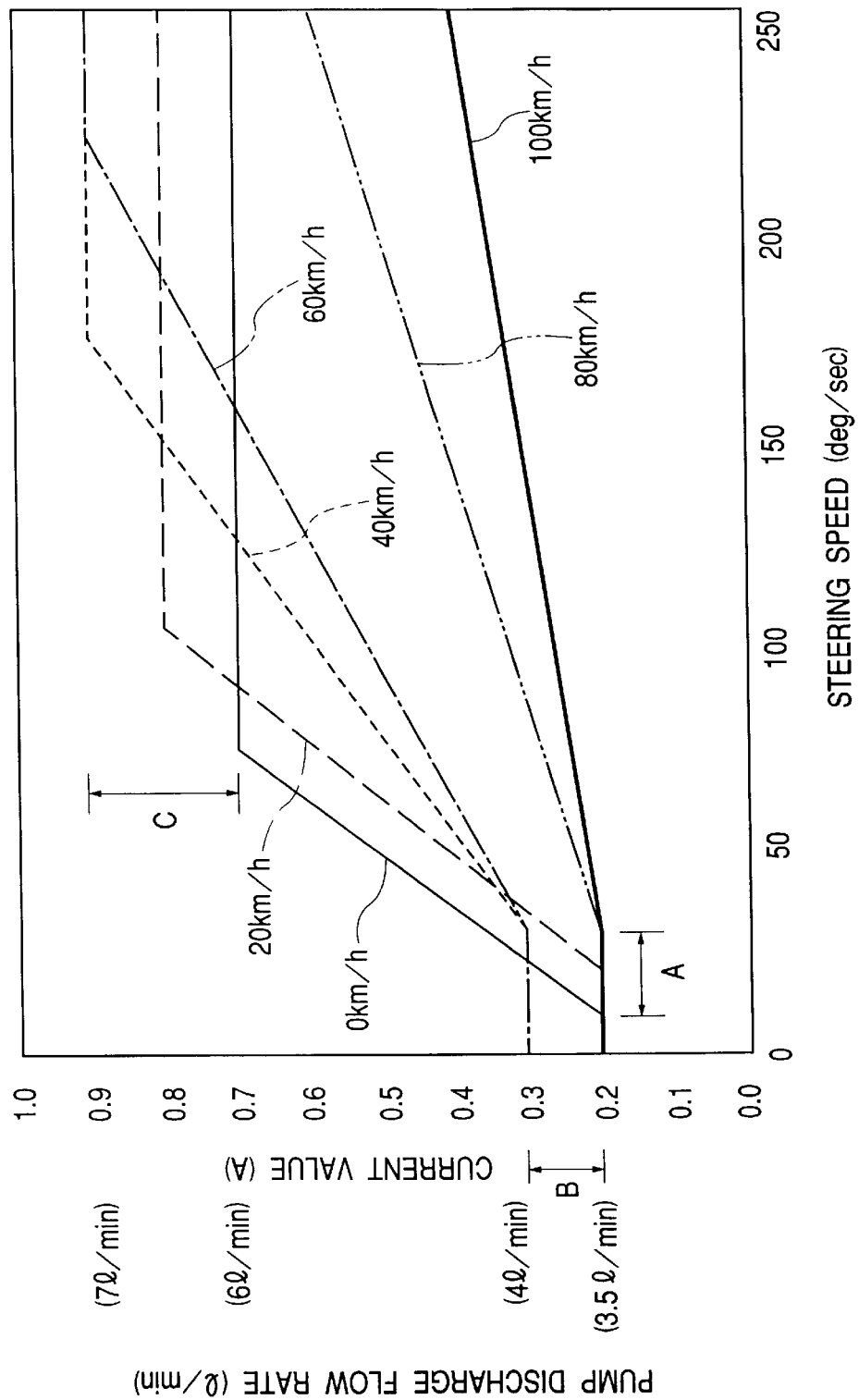
FIG. 8 is a graph showing another example of a steering speed-current characteristic by the control apparatus according to the invention.

Also, when there is a problem that a variation width of steering force is small, as shown in a range B of FIG. 8, at the time of high speed, a flow rate is reduced even for straight driving. In this example, it is constructed so that in the case of straight travel at vehicle speeds of 40 km/h and 60 km/h, the current value is controlled to 0.3 A and a discharge flow rate becomes 4 l/min, but it is constructed so that in the case of vehicle speeds of 80 km/h and 100 km/h, the current value is controlled to 0.2 A and a discharge flow rate becomes 3.5 l/min.

Also, when an energy-saving effect of the pump want to be further improved, this effect can be obtained by reducing a discharge flow rate at the time of stationary steering. For example, as shown in a range C of FIG. 8, by setting a current value at the time of stationary steering (the time of steering at a vehicle speed of 0 km/h) to 0.7 A and reducing a discharge flow rate to 6 l/min, the energy-saving effect can be improved more. Further, in the case that recovery of a flow rate is slow and a catch feeling occurs, the case can be solved by further shortening control time of a control unit (for example, 60 msec to 40 msec). Also, at the time of an increase in steering speed, a supply current to the solenoid 60 is increased speedily, but at the time of a decrease in steering speed, a flow rate at the time of holding steering can be prevented from reducing by reducing a current slowly (for example, a delay of about two seconds).

Figure 9:
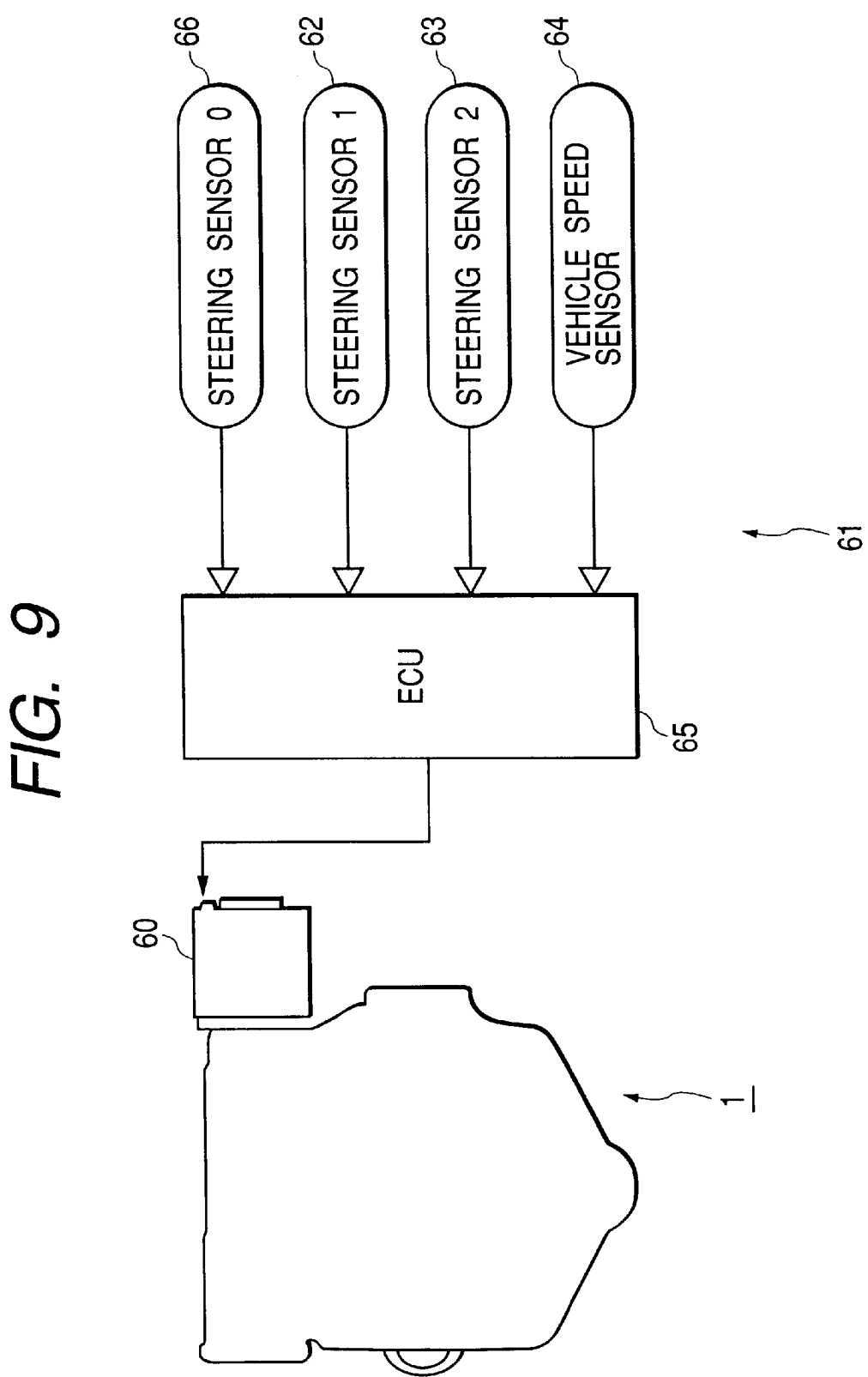
FIG. 9 is a diagram simplifying and showing a configuration of a control apparatus of a variable displacement pump for power steering apparatus according to a second embodiment.

By constructing a configuration of the embodiment so that a right or left steering direction is determined and a steering speed of one direction is calculated and a discharge flow rate of the variable displacement pump 1 is changed, effects capable of reducing energy consumption of the pump while ensuring steering force in the vicinity of a neutral position can be obtained. However, in the configuration, a steering speed becomes zero at the time of cornering and driving a curve route, so-called holding steering, so that there is a problem that steering force changes during cornering. Thus, a second embodiment is constructed so that three steering sensors 62, 63, 66 are provided in a steering column as shown in FIG. 9 and in a manner similar to the first embodiment, a right or left steering direction is determined by the two steering sensors (first steering sensor 62 and second steering sensor 63) and also a steering speed of its steering direction is detected and further a neutral position of a steering handle is detected by the additional third steering sensor 66 and a steering angle from this neutral position is calculated and the amount of discharge of the variable displacement pump 1 is changed in response to this steering angle.

A steering sensor signal from each of the steering sensors 62, 63, 66 will be described. The steering sensor signals of the first and second steering sensors 62, 63 are similar to those of the first embodiment. Then, it is constructed so that a steering sensor signal (hereinafter called a steering sensor signal 0) from the third steering sensor 66 is outputted by one pulse every one revolution of a handle, and it is set so as to output the steering sensor signal 0 at the time when the handle is positioned in the center. Also, in order to prevent false detection of a neutral position (falsely detecting that the handle is at a neutral position in the case of swerving one revolution or more), when the third steering sensor 66 detects the steering sensor signal 0 at a certain vehicle speed or higher, its position is set to a handle neutral position.

Figure 10:
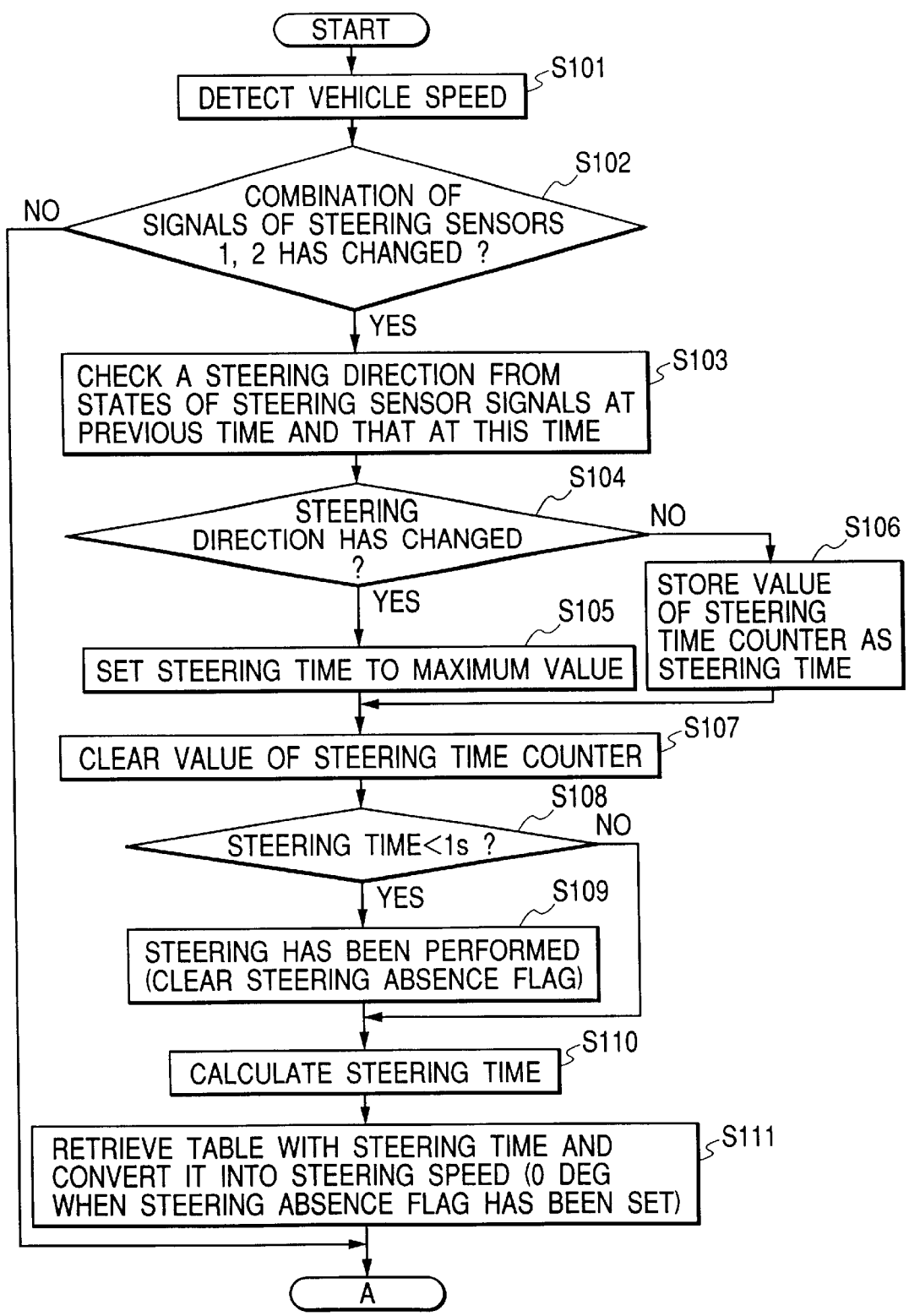
FIG. 10 is a flowchart showing one example of control of electronic driving device according to the second embodiment and shows the first half portion of the flowchart.
Figure 11:
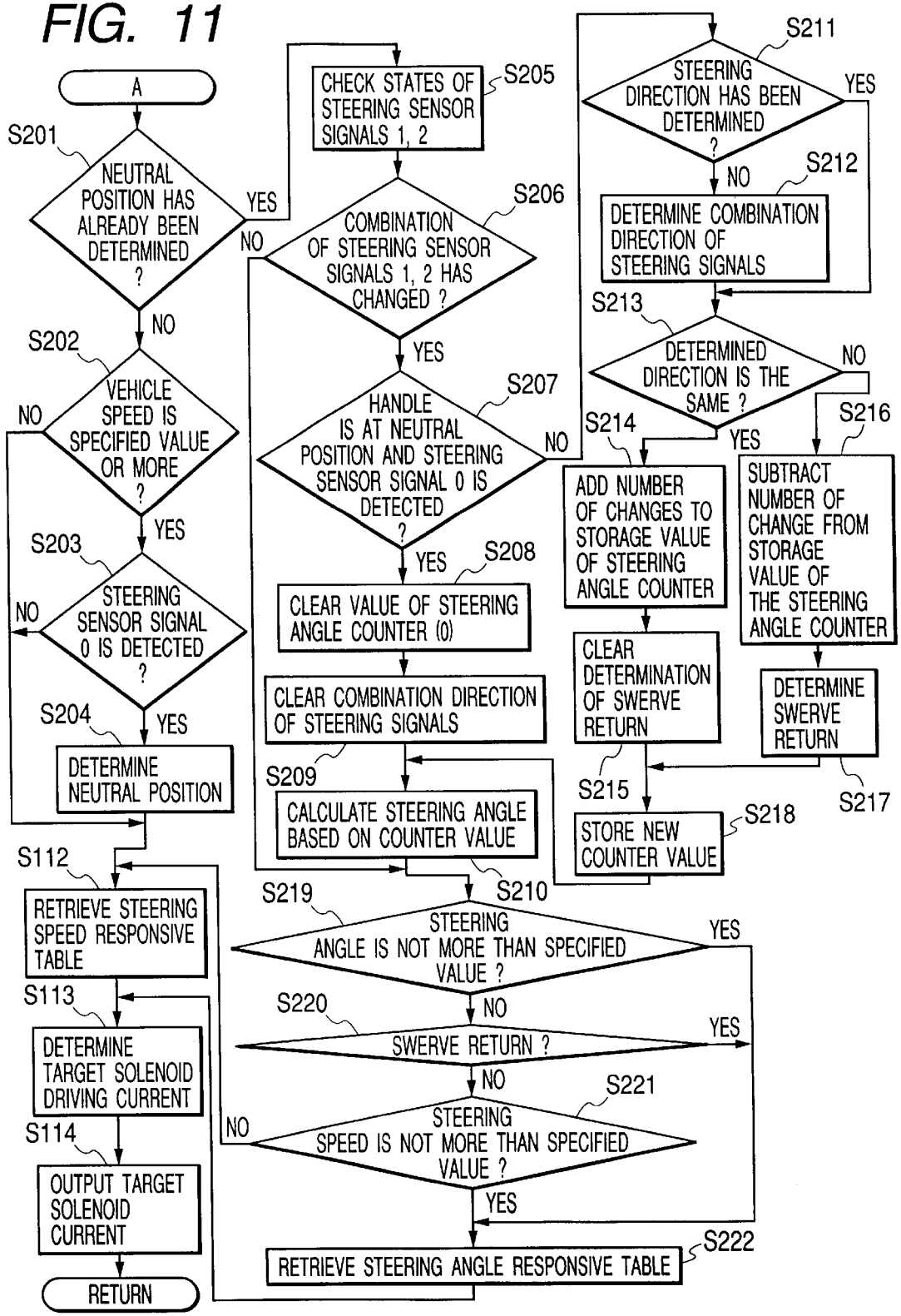
FIG. 11 shows the second half portion of the flowchart of FIG. 10.

A processing procedure by the configuration will be described by a flowchart shown in FIGS. 10 and 11. Detection of a vehicle speed, measurement of steering time, check of a steering direction and setting of a steering speed performed from step 101 (S101) to step 111 (S111) of FIG. 10 are similar to those of the first embodiment. Next, in step 201 (S201), it is decided whether or not a neutral position has already been determined. When the neutral position has not been determined, it is decided whether or not a vehicle speed is a specified value or more in step 202 (S202). Here, a determination is made using a speed impossible in a state in which a handle is rotated one revolution or more as a specified value in order to prevent false detection of the neutral position.

In the case that the vehicle speed is the specified value or more in step 202 (S202), when a steering sensor signal 0 outputted from the third steering sensor 66 is detected in step 203 (S203), the neutral position is determined (S204). In the case that the neutral position is determined in step 204, the case that the vehicle speed does not reach the specified value in step 202 (S202) and the case that the vehicle speed is the specified value or more but the steering sensor signal 0 of the third steering sensor 66 is not detected in step 203 (S203), the flowchart proceeds to step 112 (S112) and in a manner similar to the first embodiment, a steering speed responsive table is retrieved and control by steering speed responsiveness is performed (S113, S114).

Also, when the neutral position has already been determined in step 201 (S201), it can be determined whether there is right rotation or left rotation based on its neutral position, so that the flowchart proceeds to step 205 (S205) and states of steering sensor signals 1, 2 are checked. Subsequently, in step 206 (S206), it is decided whether or not combinations of a signal of the first steering sensor 62 and a signal of the second steering sensor 63 have changed in a manner similar to step 102 (S102).

When the combinations of the signals from the first and second steering sensors 62, 63 have changed, the flowchart proceeds to step 207 (S207). In this step 207 (S207), when the steering sensor signal 0 from the third steering sensor 66 is detected and its position is a neutral position, a value of a steering angle counter is cleared in step 208 (S208) and then, a combination direction of the steering signals is cleared in step 209 (S209). Thereafter, the flowchart proceeds to step 210 (S210).

When the combinations of the steering sensor signals 1, 2 have changed in step 206 (S206) and the steering sensor signal 0 from the third steering sensor is not detected or the position is not a neutral position in step 207 (S207), the flowchart proceeds to step 211 (S211) and it is decided whether or not a steering direction has already been determined. When the steering direction has not been determined in step 211 (S211), the steering direction is determined by a change in the combinations of the steering signals from the first and second steering sensors 62, 63 in step 212 (S212). Next, when it is determined that a change is made in the same direction in step 213 (S213), the number of changes is added to a storage value of the steering angle counter in step 214 (S214). In this case, determination of swerve return is cleared in step 215 (S215). Also, in the case of changing to a reverse direction, the number of changes is subtracted from the storage value of the steering angle counter in step 216 (S216). In this case, determination is made as swerve return in step 217 (S217).

In step 218 (S218), a new counter value added or subtracted in step 214 (S214) and step 216 (S216) is stored. Thereafter, the flowchart proceeds to step 210 (S210).

Incidentally, the decision and processing from step 207 to step 209 relate to right and left rotation sandwiching a handle neutral position, and the decision and processing from step 207 to step 218 relate to right and left rotation in any one region of right rotation or left rotation.

Figure 12:
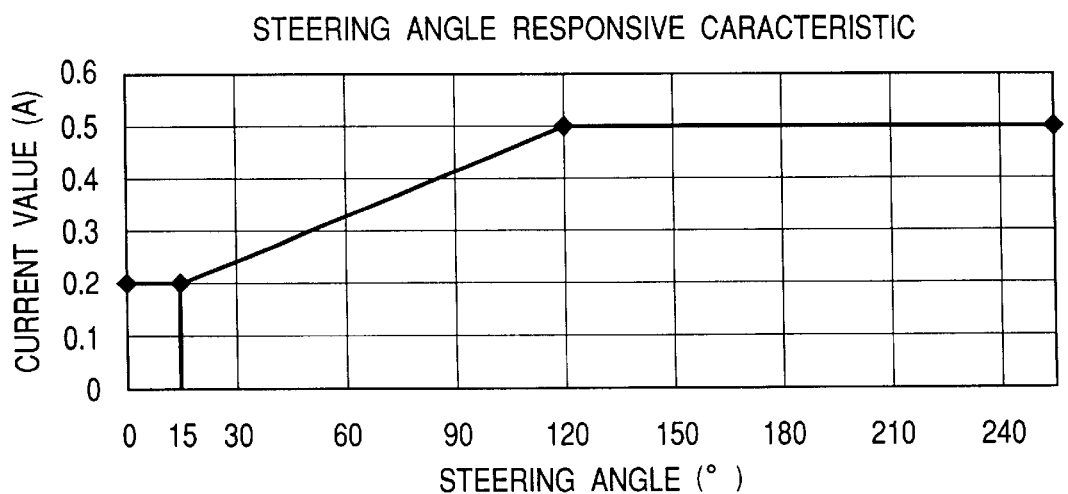
FIG. 12 is a graph showing one example of a steering angle responsive characteristic.

In step 210 (S210), a counter value stored in the steering angle counter is calculated to a steering angle. After calculating the steering angle, the flowchart proceeds to step 219 (S219) and it is determined whether or not the steering angle is a specified value or less. When the steering angle exceeds the specified value, the flowchart proceeds to step 220 (S220) and it is determined whether or not there is swerve return. When the steering angle exceeds the specified value and there is not the swerve return, it is decided whether or not a steering speed is a specified value or less in step 221 (S221). When it is determined that the steering speed is the specified value or less, there is in a holding steering state during cornering, so that retrieval is performed by a steering angle responsive table in step 222 (S222) and a target solenoid driving current is determined (S113) and is outputted (S114). FIG. 12 is a diagram showing one example of a steering angle responsive characteristic, and a solenoid driving current is selected from such a characteristic. Incidentally, this steering angle responsive characteristic is constructed so that the neutral position is detected and then steering force is not changed within a right and left specified steering angle (15°).

In the case that it is determined that the steering angle is the specified value or less in step 219 (S219) and the case that it is determined that there is the swerve return in step 220 (S220), the flowchart proceeds to step 222 (S222) and steering angle responsive control is performed.

Also, when the steering angle exceeds the specified value and there is not the swerve return and the steering speed exceeds the specified value in step 221 (S221), the flowchart proceeds to step 112 (S112) and steering speed responsive control is performed. Since a configuration of this embodiment is constructed so that the steering angle is calculated and the amount of discharge of the variable displacement pump is changed in response to the steering angle, a reduction in steering force at the time of holding steering can be prevented. Also, since there is no response to right and left steering in the vicinity of the neutral position of a handle, energy consumption of the pump can be reduced.

Figure 13:
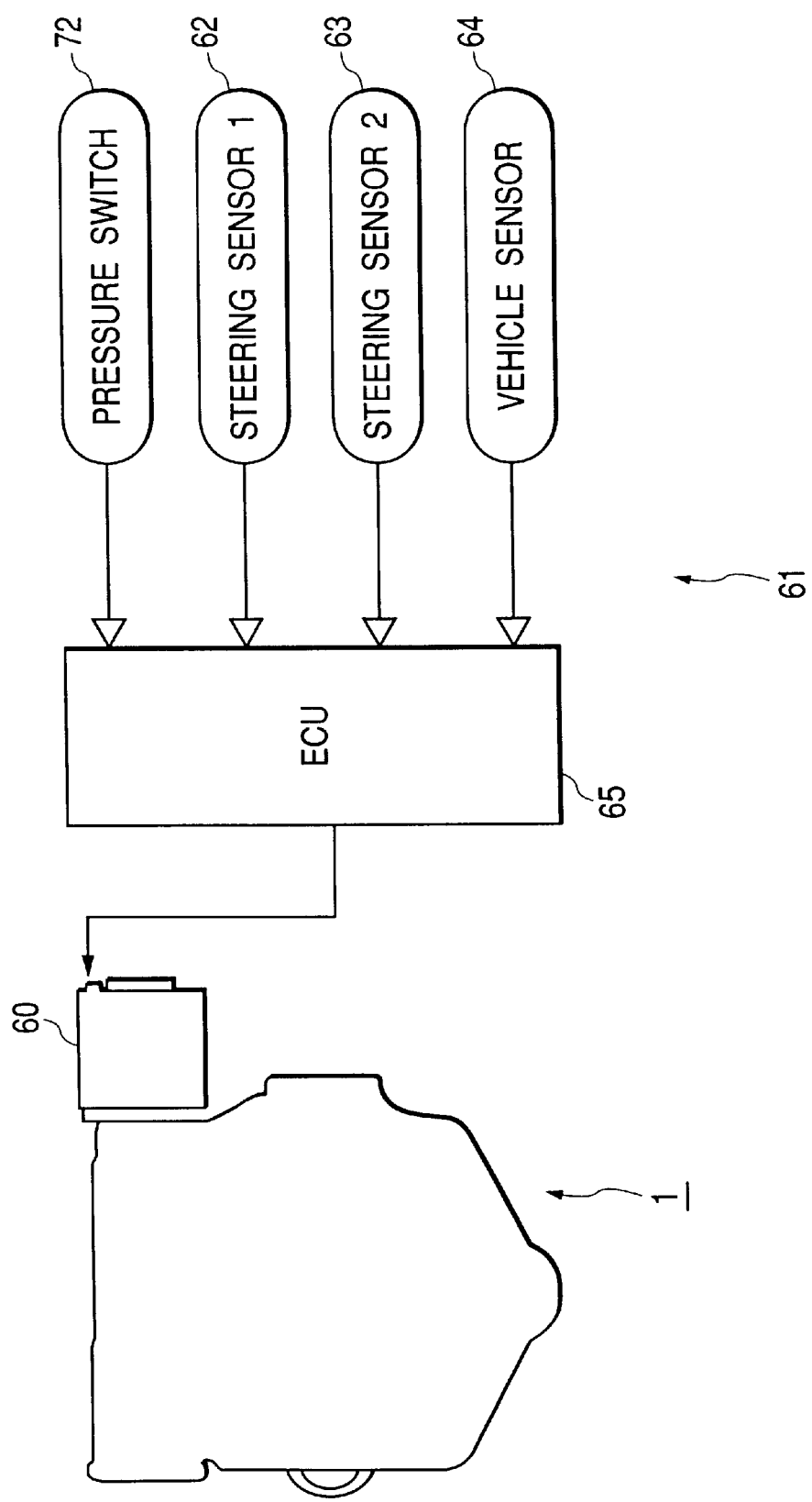
FIG. 13 is a diagram simplifying and showing a configuration of a control apparatus of a variable displacement pump for power steering apparatus according to a third embodiment.
Figure 14:
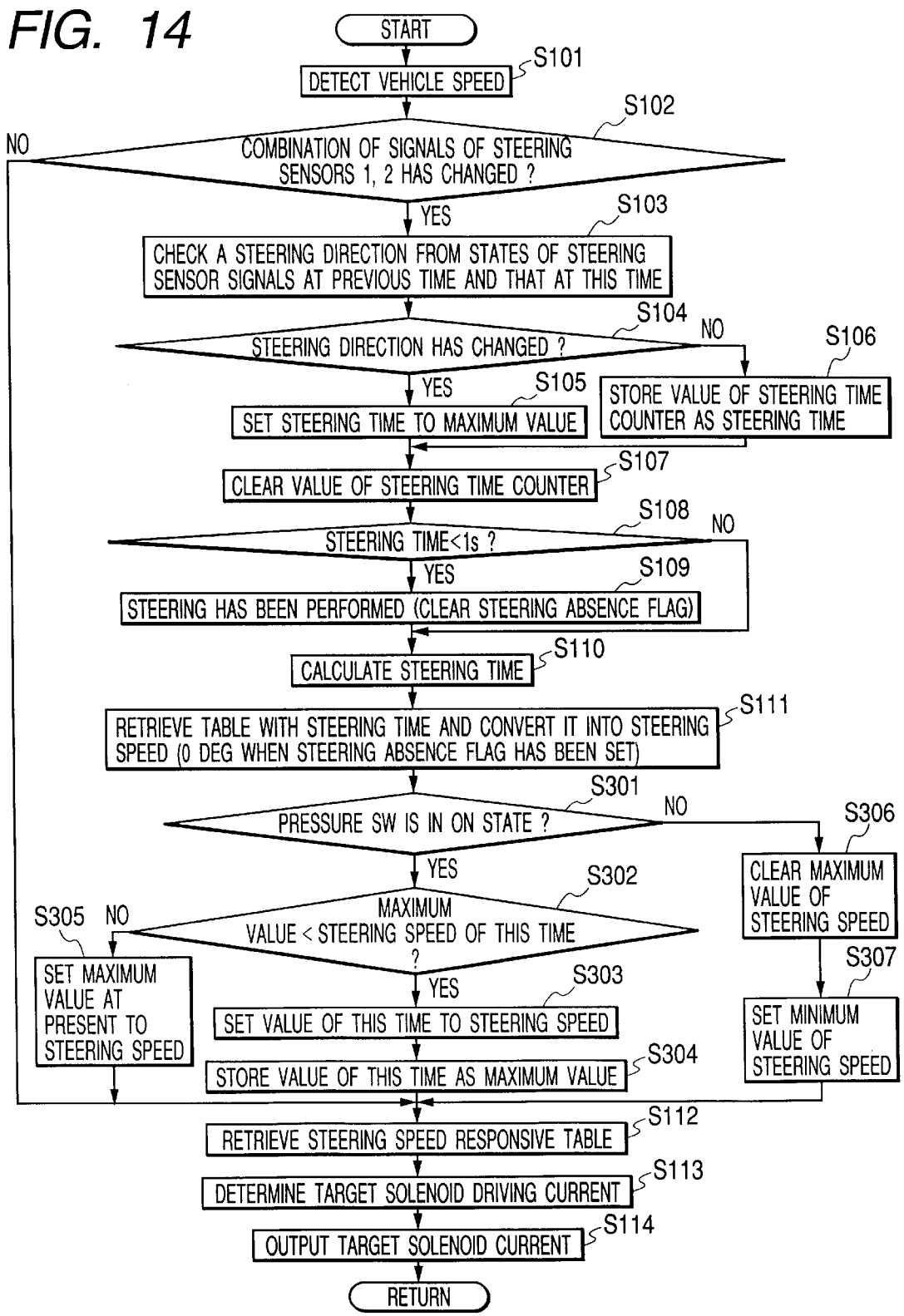
FIG. 14 is a flowchart showing one example of control of electronic driving device according to the third embodiment.

Next, a third embodiment will be described with reference to a configuration of FIG. 13 and a flowchart shown in FIG. 14. This embodiment is constructed so that in a manner similar to the first embodiment, there are provided first and second steering sensors 62, 63 and a vehicle speed sensor 64. Right or left steering is determined by steering sensor signals from these first and second steering sensors 62, 63. Also, a steering speed to one direction is calculated and a driving current of electronic driving device (solenoid) 60 is controlled in response to this steering speed and a discharge flow rate of a variable displacement pump 1 is changed.

Further, in steering speed responsive control by the configuration of the first embodiment, at the time of cornering, a steering speed becomes zero and steering force changes. Thus, this embodiment is constructed so that a pressure switch 72 is mounted in the variable displacement pump 1 and it is detected that there is in holding steering by determining the presence or absence of steering by this pressure switch 72 and a discharge flow rate of the variable displacement pump 1 is not changed during the holding steering.

In this embodiment, the processing and decision similar to the first embodiment are performed in step 101 (S101) to step 111 (S111) and from steering time obtained in step 110 (S110), a steering time to steering speed conversion table is retrieved and a conversion is made into a steering speed (S111). Thereafter, it is decided whether or not the pressure switch 72 is in an ON state in step 301 (S301).

When the pressure switch 72 is in the ON state, the flowchart proceeds to step 302 (S302) and it is decided whether or not a steering speed of this time is a speed exceeding the maximum value of stored steering speeds. When the steering speed of this time exceeds the maximum value, a value of this time is set to the steering speed in step 303 (S303) and the value of this time is stored as the maximum value in step 304 (S304).

Next, the flowchart proceeds to step 112 (S112) and a steering speed responsive table is retrieved and a target solenoid driving current in response to the maximum value of the steering speed is determined (S113) and is outputted (S114). While the pressure switch 72 is in the ON state, a solenoid current is controlled by the maximum value of the steering speed stored in step 304 (S304), so that a reduction in steering force at the time of holding steering can be prevented. Also, when the pressure switch 72 is in the ON state and the steering speed of this time is the maximum value or less, the flowchart proceeds to step 305 (S305) and the present maximum value is set to the steering speed. Therefore, the solenoid current is controlled by this steering speed.

On the other hand, when it is determined that pressure switch 72 is in an OFF state in step 301 (S301), the maximum value of the steering speed is cleared in step 306 (S306) and the minimum value of the steering speed is set in step 307 (S307). In this case, the solenoid current is controlled by the minimum value of this steering speed. Incidentally, it is not limited to the case of clearing the maximum value of the steering speed and immediately setting the minimum value, and control of returning gradually may be performed.

Since the third embodiment is constructed so that a state of the pressure switch 72 is detected and a discharge flow rate of the variable displacement pump 1 is not changed during the holding steering, a reduction in steering force at the time of holding steering can be prevented. Also, in the first embodiment, control is performed in response to a change in the steering speed during swerve return, but in this embodiment, control is performed by the minimum value of this steering speed during swerve return, so that energy consumption of the pump 1 can be reduced further than the case of the first embodiment. In addition, means attached to the variable displacement pump 1 can be used as the pressure switch 72, so that system cost is low.

Figure 15:
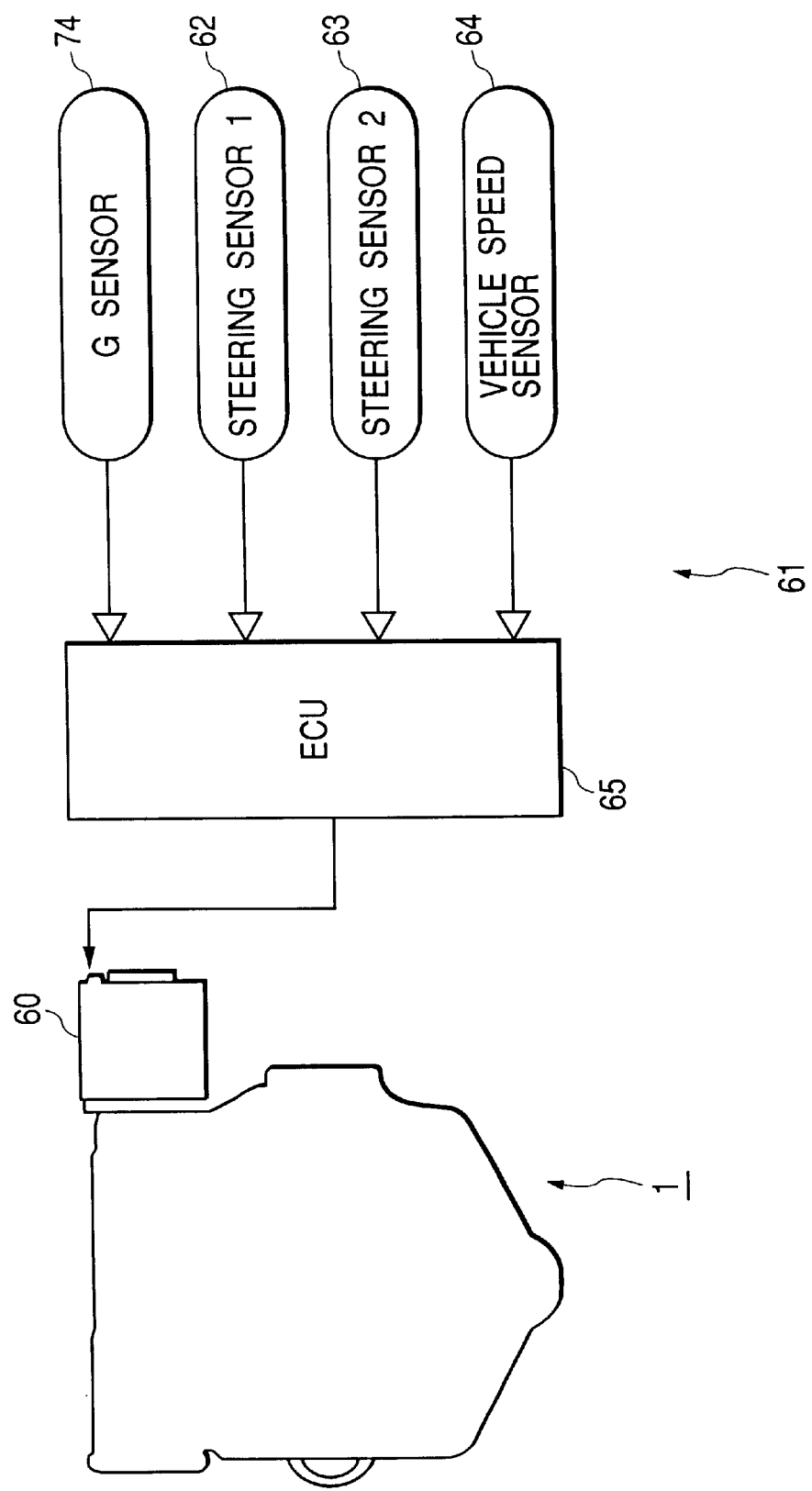
FIG. 15 is a diagram simplifying and showing a configuration of a control apparatus of a variable displacement pump for power steering apparatus according to a fourth embodiment.

FIG. 15 is a diagram showing a control apparatus of a variable displacement pump for power steering apparatus according to a fourth embodiment and in this embodiment, a G sensor is used instead of the pressure switch 72 of the third embodiment. This electronic control device 61 has a G sensor 74 in addition to first and second steering sensors 62, 63 and a vehicle speed sensor 64 similar to the first embodiment, and a current-carrying current of a solenoid 60 is controlled by signals from each of these sensors 62, 63, 64, 74 through a control unit 65.

Also in the control apparatus according to this embodiment, in order to ensure steering force in the vicinity of the center of a handle in a manner similar to each the embodiment, a basic configuration is constructed so that the two steering sensors 62, 63 are mounted in the steering column and a right or left steering direction is determined by output from these steering sensors 62, 63 and also a steering speed to the determined one direction is calculated and a current-carrying current of the solenoid 60 is controlled and a discharge flow rate of a variable displacement pump 1 is changed.

Further, it is characterized in that a G sensor 74 is mounted and it is detected that there is in cornering by detecting lateral G by this G sensor 74 and determining whether or not there is in cornering and a discharge flow rate of the variable displacement pump 1 is not changed.

Figure 16:
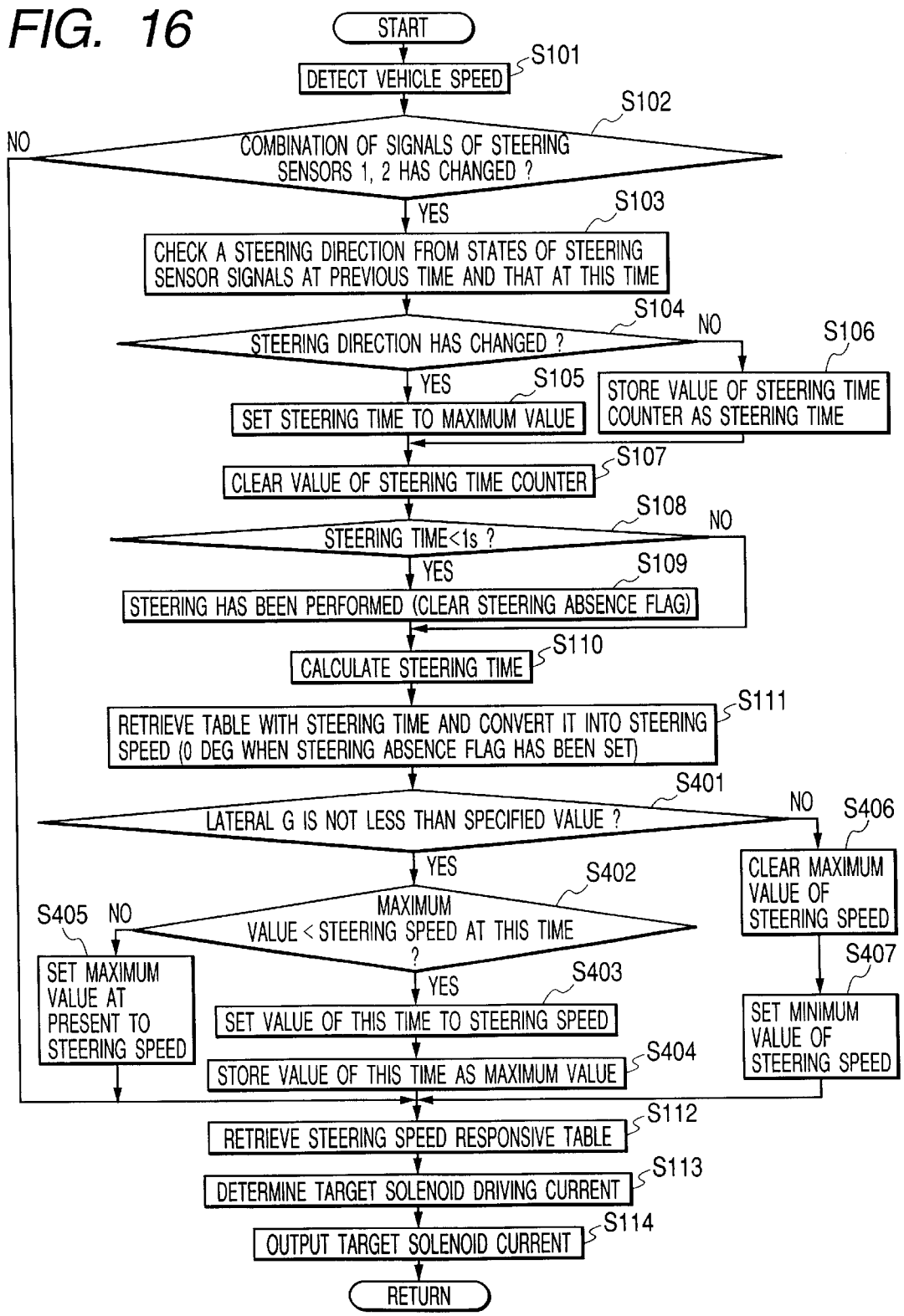
FIG. 16 is a flowchart showing one example of control of electronic driving device according to the fourth embodiment.
Figure 17:
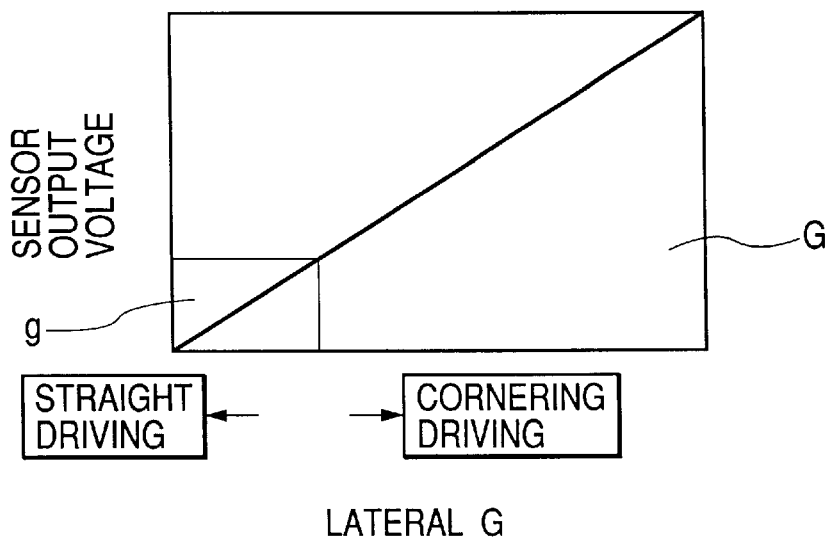
FIG. 17 is a characteristic diagram illustrating a driving state detected by a G sensor signal.

In this fourth embodiment, as shown in a flowchart of FIG. 16, the processing and decision similar to those of the first embodiment are performed from step 101 (S101) to step 111 (S111) and thereafter, it is decided whether or not lateral G is a specified value or more by a signal outputted from the G sensor 74 in step 401 (S401). When the output of the G sensor 74 is the specified value or more (see a range G of FIG. 17), it is decided that there is in cornering, and in a manner similar to the third embodiment, a solenoid current is controlled by the maximum value of a steering speed (S402 to S404, S405, S112 to S114). Also, when the output of the G sensor 74 is the specified value or less (see a range g of FIG. 17), it is decided that there is straight driving and the maximum value of the steering speed is cleared and the minimum value of the steering speed is set and the solenoid current is controlled by this minimum value (S406, S407, S112 to S114). Also in this embodiment, the lateral G is detected by the G sensor 74 and the solenoid current is controlled, so that a reduction in steering force during cornering and variations in steering force can be prevented.

As described above, according to the invention, it is constructed so that there are provided an electronic driving device for giving thrust in the axial direction to the spool of the control valve and an electronic control device for controlling a driving current of the electronic driving device. The electronic control member comprises a steering sensor. The electronic control member determines a steering direction based on a signal from the steering sensor. The electronic control member calculates a steering speed in the steering direction. The electronic control member controls the driving current of the electronic driving device in response to the steering speed. Whereby stable steering force in the vicinity of the center position of a handle can be ensured. Also, energy consumption of the pump can be reduced since there is no response to right and left steering in the vicinity of the center. Stable steering force can also be ensured in response to the driving speed.

According to the fifth aspect of the invention, the electronic control device includes another steering sensor for detecting a neutral position of a handle. The electronic control device calculates a steering angle from the neutral position. The electronic control device controls the driving current of the electronic driving device in response to the steering angle. Therefore, a reduction in steering force at the time of holding steering can be prevented in addition to an effect of the first to fourth aspects of the invention According to a sixth aspect of the invention, a pressure sensor for detecting a fluid pressure in the discharge passage is provided and a discharge flow rate is controlled based on maximum steering speed within a period during which a detection pressure of the pressure sensor is not less than a predetermined. Therefore, a reduction in steering force at the time of holding steering can be prevented in addition to an effect according to the first to fourth aspects of the invention.

According to a seventh aspect of the invention, the electronic control device comprises a G sensor and a discharge flow rate is controlled based on maximum steering speed within a period during which lateral G detected by the G sensor is not more than a predetermined value. Therefore, a reduction in steering force at the time of holding steering can be prevented in addition to an effect according to the first to fourth aspects of the invention.

What is claimed is:

1. A variable displacement pump for a steering apparatus comprising:
   a control apparatus;
   a cam ring swingably supported within a pump body;
   a rotor rotatably placed within the cam ring;
   first and second fluid pressure chambers formed at both sides in a movement direction of the cam ring;
   a urging member for urging the cam ring in a direction in which a pump capacity of a pump chamber becomes maximum;
   a metering orifice provided at a midpoint of a discharge passage for pressure fluid delivered from the pump chambers; and
   a control valve including a spool acting in an axial direction thereof due to fluid pressure difference between upper stream and down stream of the metering orifice, in which operation of the control valve controls the fluid pressure of at least one of the fluid pressure chambers to swing the cam ring,
   wherein the control apparatus includes:
      an electronic driving device for giving thrust in the axial direction to the spool of the control valve; and
      an electronic control device for controlling a driving current of the electronic driving device;
   wherein the electronic control device comprises a first steering sensor and a second steering sensor;
   wherein the electronic control device determines a steering direction based on a signal from the first steering sensor;
   wherein the electronic control member calculates a steering speed in the steering direction;
   wherein the electronic control member controls the driving current of the electronic driving device in response to the steering speed;
   wherein the electronic control device detects a neutral position of a steering wheel based on a signal from the second steering sensor and calculates a steering angle from the neutral position;
   wherein when the steering angle is not larger than a predetermined value, the electronic control device controls the driving current of the electronic driving device so that a discharge flow rate is lower than that in a case where the steering angle is larger than the predetermined value; and
   wherein when the steering wheel is located at the neutral position, the steering angle is not larger than the predetermined value.

2. A variable displacement pump for a steering apparatus comprising:
   a variable displacement pump for a power steering apparatus;
   an electronic driving device for giving thrust in the axial direction to a spool of a control valve; and
   an electronic control device for controlling a driving current of the electronic driving device,
   wherein the variable displacement pump includes:
      a cam ring swingably supported within a pump body;
      a rotor rotatably placed within the cam ring;
      first and second fluid pressure chambers formed at both sides in a movement direction of the cam ring;
      a urging member for urging the cam ring in a direction in which a pump capacity of a pump chamber becomes maximum;
      a metering orifice provided at a midpoint of a discharge passage for pressure fluid delivered from the pump chambers; and
      a control valve including a spool acting in an axial direction thereof due to fluid pressure difference between upper stream and down stream of the metering orifice, in which operation of the control valve controls the fluid pressure of at least one of the fluid pressure chambers to swing the cam ring;
   wherein the electronic control device comprises a first steering sensor, a second steering sensor, and a vehicle speed sensor;
   wherein the electronic control device determines a steering direction based on a signal from the first steering sensor;
   wherein the electronic control device calculates a steering speed in the steering direction;
   wherein the electronic control device controls the driving current of the electronic driving device so that a rising point of discharge flow rate changes in response to the steering speed and a vehicle speed from the vehicle speed sensor;
   wherein the electronic control device detects a neutral position of a steering wheel based on a signal from the second steering sensor and calculates a steering angle from the neutral position;

wherein when the steering angle is not larger than a predetermined value, the electronic control device controls the driving current of the electronic driving device so that a discharge flow rate is lower than that in a case where the steering angle is larger than the predetermined value; and wherein when the steering wheel is located at the neutral position, the steering angle is not larger than the predetermined value.

3. A variable displacement pump for a steering apparatus comprising:

a variable displacement pump for power steering apparatus;

an electronic driving device for giving trust in the axial direction to a spool of a control valve; and an electronic control device for controlling a driving current of the electronic driving device, wherein the variable displacement pump includes:
a cam ring swingably supported within a pump body, a rotor rotatably placed within the cam ring;
first and second fluid pressure chambers formed at both sides in a movement direction of the cam ring;
a urging member for urging the cam ring in a direction in which a pump capacity of a pump chamber becomes maximum;
a metering orifice provided at a midpoint of a discharge passage for pressure fluid delivered from the pump chambers; and
a control valve including a spool acting in an axial direction thereof due to fluid pressure difference between upper stream and down stream of the metering orifice, in which operation of the control valve controls the fluid pressure of at least one of the fluid pressure chambers to swing the cam ring;

wherein the electronic control device comprises a first steering sensor, a second steering sensor, and a vehicle speed sensor;

wherein the electronic control device determines a steering direction based on a signal from the first steering sensor;

wherein the electronic control device calculates a steering speed in the steering direction;

wherein the electronic control device controls the driving current of the electronic driving device in response to the steering speed and a vehicle speed from the vehicle speed sensor;

wherein the driving current of the electronic driving device is controlled so that discharge flow rate at a time of straight travel during high speed driving is lower than that at a time middle speed driving;

wherein the electronic control device detects a neutral position of a steering wheel based on a signal from the second steering sensor and calculates a steering angle from the neutral position;

wherein when the steering angle is not larger than a predetermined value, the electronic control device controls the driving current of the electronic driving device so that a discharge flow rate is lower than that in a case where the steering angle is larger than the predetermined value; and wherein when the steering wheel is located at the neutral position, the steering angle is not larger than the predetermined value.

4. A variable displacement pump for a steering apparatus comprising:

a variable displacement pump for power steering apparatus;

an electronic driving device for giving thrust in the axial direction to a spool of a control valve; and an electronic control device for controlling a driving current of the electronic driving device;

wherein the variable displacement pump includes:
a cam ring swingably supported within a pump body;
a rotor rotatably placed within the cam ring;
first and second fluid pressure chambers formed at both sides in a movement direction of the cam ring;
a urging member for urging the cam ring in a direction in which a pump capacity of a pump chamber becomes maximum;
a metering orifice provided at a midpoint of a discharge passage for pressure fluid delivered from the pump chambers; and
a control valve including a spool acting in an axial direction thereof due to fluid pressure difference between upper stream and down stream of the metering orifice, in which operation of the control valve controls the fluid pressure of at least one of the fluid pressure chambers to swing the cam ring;

wherein the electronic control device comprises a first steering sensor, second steering sensor, and a vehicle speed sensor;

wherein the electronic control device determines a steering direction based on a signal from the steering sensor;

wherein the electronic control device calculates a steering speed in the steering direction;

wherein the electronic control device controls the driving current of the electronic driving device in response to the steering speed and a vehicle speed from the vehicle speed sensor;

wherein the driving current of the electronic driving device is controlled so that maximum discharge flow rate at a time of steering during a vehicle stop or low speed driving is lower than that at a time of middle speed driving;

wherein the electronic control device detects a neutral position of a steering wheel based on a signal from the second steering sensor and calculates a steering angle from the neutral position;

wherein when the steering angle is not larger than a predetermined value, the electronic control device controls the driving current of the electronic driving device so that a discharge flow rate is lower than that in a case where the steering angle is larger than the predetermined value; and wherein when the steering wheel is located at the neutral position, the steering angle is not larger than the predetermined value.

5. The control apparatus according to claim 1, wherein a pressure sensor for detecting a fluid pressure in the discharge passage is provided; and wherein a discharge flow rate is controlled based on maximum steering speed within a period during which a detection pressure of the pressure sensor is not less than a predetermined value.

6. The control apparatus according to claim 1, wherein the electronic control device comprises a G sensor; and wherein a discharge flow rate is controlled based on maximum steering speed within a period during which lateral G detected by the G sensor is not more than a predetermined value.

7. The control apparatus according to claim 2, wherein a pressure sensor for detecting a fluid pressure in the discharge passage is provided; and wherein a discharge flow rate is controlled based on maximum steering speed within a period during which a detection pressure of the pressure sensor is not less than a predetermined value.

8. The control apparatus according to claim 2, wherein the electronic control device comprises a G sensor; and wherein a discharge flow rate is controlled based on maximum steering speed within a period during which lateral G detected by the G sensor is not more than a predetermined value.

9. The control apparatus according to claim 3, wherein a pressure sensor for detecting a fluid pressure in the discharge passage is provided; and wherein a discharge flow rate is controlled based on maximum steering speed within a period during which a detection pressure of the pressure sensor is not less than a predetermined value.

10. The control apparatus according to claim 3, wherein the electronic control device comprises a G sensor; and wherein a discharge flow rate is controlled based on maximum steering speed within a period during which lateral G detected by the G sensor is not more than a predetermined value.

11. The control apparatus according to claim 4, wherein a pressure sensor for detecting a fluid pressure in the discharge passage is provided; and wherein a discharge flow rate is controlled based on maximum steering speed within a period during which a detection pressure of the pressure sensor is not less than a predetermined value.

12. The control apparatus according to claim 4, wherein the electronic control device comprises a G sensor; and wherein a discharge flow rate is controlled based on maximum steering speed within a period during which lateral G detected by the G sensor is not more than a predetermined value.

13. The control apparatus according to claim 1, wherein the electronic control member controls the driving current of the electronic driving device so that discharge flow rate decreases as vehicle speed increases.

\* \* \* \* \*